(12) United States Patent
Ichinose et al.

(10) Patent No.: US 7,129,674 B2
(45) Date of Patent: Oct. 31, 2006

(54) POWER SUPPLY APPARATUS HAVING CONTROL SECTION FOR CONTROLLING QUANTITY OF FUEL TO BE SUPPLIED TO FUEL CELL

(75) Inventors: Toshihiko Ichinose, Ikoma (JP); Masahiro Takada, Hamana-gun (JP); Katsumi Kozu, Sanda (JP); So Kuranaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 27 days.

(21) Appl. No.: 10/900,931

(22) Filed: Jul. 28, 2004

(65) Prior Publication Data

US 2005/0040786 A1    Feb. 24, 2005

(30) Foreign Application Priority Data

Aug. 19, 2003  (JP) ............................. 2003-295575

(51) Int. Cl.
*H02J 7/00*   (2006.01)

(52) U.S. Cl. ..................................... 320/101; 320/104
(58) Field of Classification Search ............... 320/101, 320/103, 104; 429/23
See application file for complete search history.

(56) References Cited

U.S. PATENT DOCUMENTS 4,839,574 A * 6/1989 Takabayashi ............... 320/101

2001/0018138 A1* 8/2001 Iwase .......................... 429/13

FOREIGN PATENT DOCUMENTS

JP         2000-12059         1/2000

* cited by examiner

*Primary Examiner*—Karl Easthom
*Assistant Examiner*—Aaron Piggush
(74) *Attorney, Agent, or Firm*—Pearne & Gordon LLP

(57) ABSTRACT

The power supply apparatus of the present invention comprises a fuel cell, a secondary battery for supplying power to a load, a power measurement section for measuring the output power of the fuel cell, a power converter which inputs output of the fuel cell, controls the output power so that the input voltage or the input current approaches the operation target value, supplies the output power to the load and/or the secondary battery and conducts a power conversion, and a control section which controls quantity of fuel to be supplied to the fuel cell, and also indicates to the power converter of an operation target value that comes within predetermined range which includes the smallest quantity of fuel the fuel cell discharges, wherein the control section sequentially indicates a plurality of the target values for power measurement to the power converter, the power measurement section measures the output power of the fuel cell for each target value for power measurement, and the control section seeks the target value which gives the maximum power within a plurality of output powers, and updates the operation target value based on that value.

12 Claims, 12 Drawing Sheets

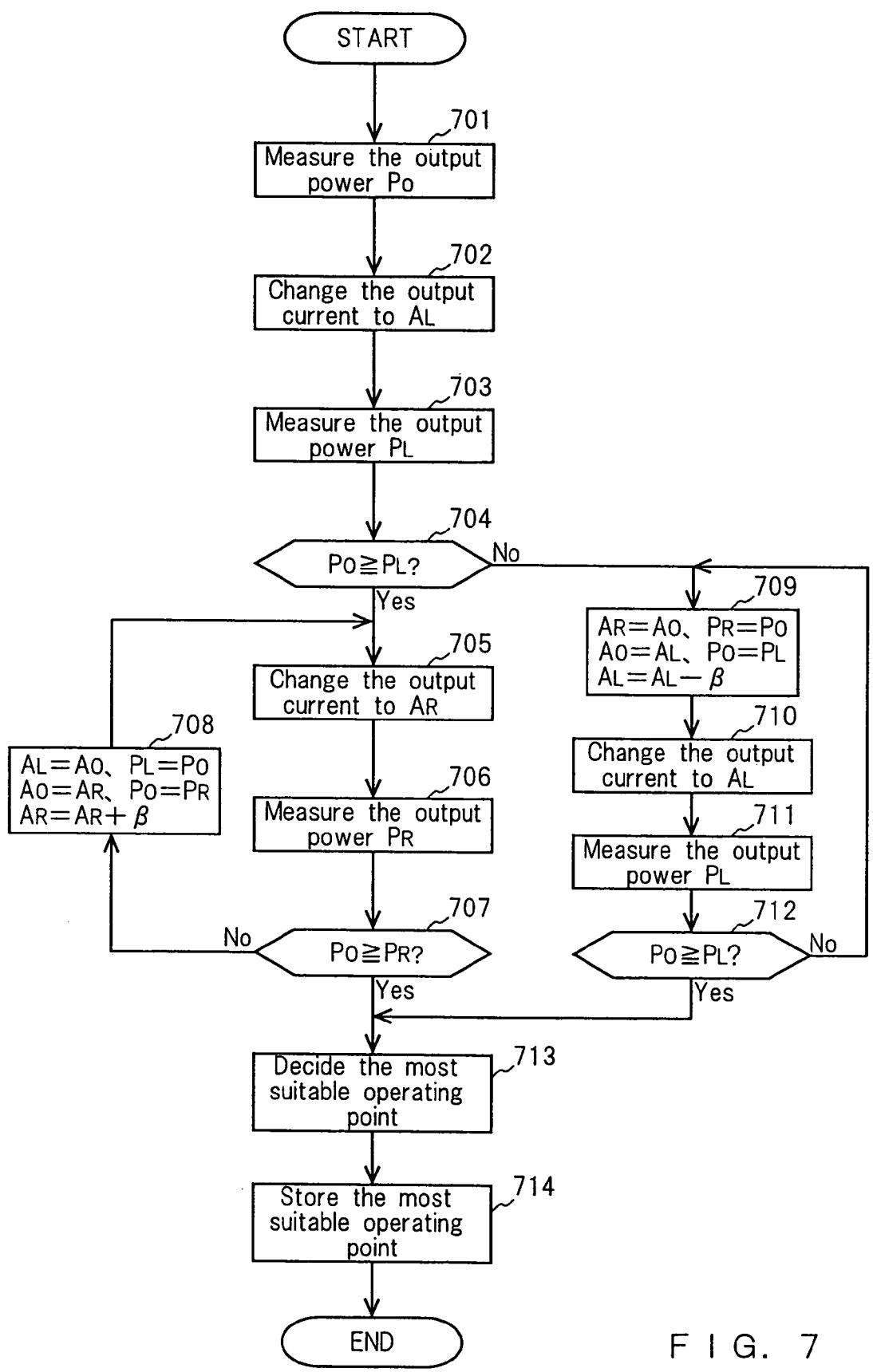
F I G. 7

POWER SUPPLY APPARATUS HAVING CONTROL SECTION FOR CONTROLLING QUANTITY OF FUEL TO BE SUPPLIED TO FUEL CELL

BACKGROUND OF THE INVENTION

The present invention relates to a power supply apparatus having a fuel cell.

Currently, a secondary battery such as a lithium ion battery or a nickel metal hydride battery is used as a power supply apparatus in portable electronic/electrical equipment such as a personal computer. However, the secondary battery can consecutively supply power for only a maximum of about 4 hours to a personal computer. Recently, the fuel cell that can consecutively supply power for 20 to 40 hours to a personal computer is drawing attention.

It is circulation type fuel cell that is a representative type fuel cell which uses methanol for fuel. FIG. 11 is a block diagram showing the configuration of a circulation type fuel cell in the conventional art. In FIG. 11, reference numeral 111 denotes a return pump, reference numeral 112 denotes a dilution tank, reference numeral 113 denotes a methanol pump, reference numeral 114 denotes a methanol tank, reference numeral 1105 denotes a fuel cell control section, reference numeral 116 denotes a fuel cell, and reference numeral 1107 denotes a gas-liquid separator. The fuel cell 116 has a stack 122, a fuel pump 123, and an air pump 124.

Methanol ($CH_3OH$) of a several to a 100% concentration is stored in the methanol tank 114.

The methanol pump 113 pumps methanol into the dilution tank 112 from the methanol tank 114 based on a command by the fuel cell control section 1105. The dilution tank 112 dilutes methanol of a several to a 100% concentration to a 5% wt methanol. The fuel pump 123 pumps diluted methanol into the stack 122 from the dilution tank 112 based on a command by the fuel cell control section 1105. The air pump 124 pumps air into the stack 122 based on a command by the fuel cell control section 1105.

In the stack 122, methanol is supplied to a fuel electrode (−), and air is supplied to an air electrode (+). At the fuel electrode (−), in the area referred to as a three-phase interface where methanol and water which are reactants, a catalyst (an electrode surface), and electrolyte comes in contact, methanol reacts with water and turns into carbon dioxide, hydrogen ions, and electrons ($CH_3OH+H_2O \rightarrow CO_2+6H^++6e^-$). Hydrogen ions pass across a polymer membrane, while electrons pass across an external load, and respectively reach the air electrode (+). At the air electrode (+), atmospheric oxygen comes in contact with hydrogen ions at the three-phase interface, deprives electrons from the catalyst (an electrode surface) and reacts, turning into water ($3/2O_2+6H^++6e^- \rightarrow 3H_2O$).

The stack 122 discharges the 3 to 5% wt methanol that is spent, carbon dioxide, and water from the fuel electrode (−) side. The stack 122 discharges water and air from the air electrode (+) side. The gas-liquid separator 1107 isolates carbon dioxide from the gas comprising methanol, carbon dioxide, and water which are discharged from the stack 122, and discharges it. The return pump 111 pumps the remaining isolated methanol and water into the dilution tank 112. Methanol and water are reused for producing a diluted methanol in the dilution tank 112.

A fuel cell system and a fuel cell control method of the conventional art which operates at the operating point with the highest energy conversion efficiency is disclosed in the Official Gazette of Japanese Unexamined Patent Publication No. 2000-12059. FIG. 12 is a block diagram showing the configuration of the fuel cell system of the conventional art. A reformer 1228 produces a hydrogen-rich gas (a reforming gas) containing hydrogen by the steam reforming reaction of methanol, from methanol and water that was poured in as fuel 1224. The fuel cell 1236 generates power using this hydrogen-rich gas as a fuel gas. The Control section 1220 derives a characteristic of output current-output voltage that corresponds to the quantity of gas taken in, and calculates from that characteristic the highest point of energy conversion efficiency in the fuel cell 1236. The fuel cell 1236 is operated at this point.

In the conventional circulation type fuel cells, there is a disadvantage that a considerable quantity of methanol is exhausted together with carbon dioxide, since it is difficult to divide only the carbon dioxide from spent fuel. Therefore, 10% of the quantity of supplied methanol at most is transformed into an effective power. Hence, the fuel utilization ratio is small.

The fuel cell system and the fuel cell control method in the conventional art have a disadvantage that the apparatus becomes expensive and upsizes, since it has a reformer. In the conventional art, the fuel cell 1236 is operated at the best point of energy conversion efficiency (=power generation efficiency×gas utilization ratio). Due to necessity of sufficiently supplying fuel to the fuel cell system, if the fuel cell system and the fuel cell control method of the conventional art were applied to a non-circulation type DMFC (Direct Methanol Fuel Cell), a large quantity of unused methanol would be discharged. Therefore, the fuel cell system and the fuel cell control method of the conventional art are not suitable for a non-circulation type DMFC.

A non-circulation type fuel cell as a type of the fuel cell that discharges spent fuel without circulating fuel is known. In the fuel cell, methanol supplied from the entry port of the fuel cell is gradually consumed, and is discharged from the exit port. However, there is a disadvantage that the output voltage of the fuel cell will drastically drop when supplied methanol is insufficient in contrast to the current to be outputted. In the conventional non-circulation type fuel cell with a view to making the fuel cell output the power with stability and deal with the sudden changes of load, substantial quantity of unused methanol is discharged from the fuel cell. However, methanol cannot be discharged as it is because of its toxicity. Since unused fuel is discharged to some extent, non-circulation type fuel cell was thought as not suitable for a fuel cell using toxic methanol for fuel.

Furthermore, the fuel cell system and the fuel cell control method of the conventional art has a characteristic of output current-output voltage of the initial period on a ROM in advance as a standard curve characteristic, and by reading this out, the highest point of energy conversion efficiency is calculated. Therefore, there is a disadvantage that the fuel cell cannot generate power that is targeted, when operating temperature deviates from an ideal value, or when the highest point deviates due to various factor such as the secular change of the fuel cell.

The present invention is made in view of these disadvantages mentioned above, and is intended to provide a stable power supply apparatus with a clean discharge and outstanding fuel utilization ratio, even when the fuel cell undergoes a secular change, or goes under various conditions such as temperature of a fuel cell or quantity of water of the electrolysis membrane of a fuel cell.

BRIEF SUMMARY OF THE INVENTION

In order to solve the disadvantages mentioned above, the present invention has the following configuration. The power supply apparatus in accordance with the present invention from one aspect comprises a fuel cell, a secondary battery for supplying power to a load, a power measurement section for measuring an output power of the above-mentioned fuel cell, a power converter which inputs the output power of the above-mentioned fuel cell, controls the above-mentioned output power so that an input voltage or an input current approaches the operation target value, supplies the above-mentioned output power to the above-mentioned load and/or the above-mentioned secondary battery and conducts a-power conversion, and a control section which controls quantity of fuel to be supplied to the above-mentioned fuel cell, and also indicates to the above-mentioned power converter of the above-mentioned operation target value that comes within predetermined range which includes the smallest quantity of fuel that the above-mentioned fuel cell discharges, wherein the power supply apparatus is characterized in that the above-mentioned control section indicates a plurality of the target values for power measurement to the above-mentioned power converter, the above-mentioned power measurement section measures the output power of the above-mentioned fuel cell for each target value for power measurement, and the above-mentioned control section updates the above-mentioned operation target value based on the above-mentioned plurality of output power.

By measuring the output power using a plurality of the target values for power measurement, the present invention has an action capable of realizing a power supply apparatus which seeks out the most suitable operation target value in the present condition, even when the fuel cell undergoes a secular change, or goes under various conditions such as temperature change, quantity of water of electrolysis membrane.

The power measurement section typically measures the output current and the output voltage of the fuel cell, and calculates the product of the output current and the output voltage (the output power of the fuel cell). The power measurement section may calculate the output power of the fuel cell by measuring the output voltage and the output current of a power converter (e.g. a DC—DC converter), and dividing the product with the power conversion efficiency ratio of the power converter. In a case where the power conversion efficiency of the power converter can be considered to be near uniformity, the output power of the power converter may be treated as approximately the output power of the fuel cell.

Furthermore, the power supply apparatus in accordance with the present invention from another aspect comprises a fuel cell, a secondary battery for supplying power to a load, a power measurement section for measuring an output power of the above-mentioned fuel cell, a power converter which inputs the output of the above-mentioned fuel cell, controls the above-mentioned output power so that an input voltage or an input current approaches an operation target value, supplies the above-mentioned output power to the above-mentioned load and/or the above-mentioned secondary battery and conducts a power conversion, and a control section which controls quantity of fuel to be supplied to the above-mentioned fuel cell, and also indicates to the above-mentioned power converter of the above-mentioned operation target value that comes within predetermined range which includes the smallest quantity of fuel that the above-mentioned fuel cell discharges, wherein the above-mentioned power supply apparatus is characterized in that the above-mentioned control section sequentially indicates a plurality of the target values for power measurement to the above-mentioned power converter, the above-mentioned power measurement section measures the output power of the above-mentioned fuel cell for each target value for power measurement, the above-mentioned control section seeks a target value which gives the maximum power among the above-mentioned plurality of output power and updates the above-mentioned target value which gives the maximum power itself, or values which are gained from subtracting or adding the predetermined current or voltage from the above-mentioned target value which gives the maximum power, as the above-mentioned operation target value.

By calculating with the target value which gives the maximum power as a criteria, the present invention has an action capable of realizing a power supply apparatus which constantly seeks out the most suitable operation target value in the present condition, even when the fuel cell undergoes a secular change, or goes under various conditions such as temperature change, quantity of water of electrolysis membrane.

In a power supply apparatus wherein the operation target value of the fuel cell differs from "the target value which gives the maximum power", to seek the operation target value with minimum toxic exhaust gas or the operation target value with minimum fuel to be discharged, the power supply apparatus initially seeks "the target value which gives the maximum power" by measurement. Using that target value as a criteria, the power supply apparatus then sets the point which is shifted a certain voltage, a certain current or a certain percentage from "the target value which gives the maximum power", as the most suitable operation target value.

Furthermore, the power supply apparatus in accordance with the present invention from still another aspect wherein the above-mentioned control section has a plurality of power generating modes, and supplies to the above-mentioned fuel cell a certain quantity of fuel per unit time which varies for each above-mentioned power generating modes, the above-mentioned power supply apparatus further comprising a memory section for storing the above-mentioned operation target value and/or the above-mentioned target value which gives the maximum power for each above-mentioned power generating modes, wherein the power supply apparatus is characterized in that at a startup of the power supply apparatus, or when the above-mentioned power generating mode is changed, or at least once in a predetermined time, the above-mentioned control section indicates a plurality of target values for power measurement to the above-mentioned power converter, the above-mentioned power measurement section measures output of the above-mentioned fuel cell at each the above-mentioned target value for power measurement, the above-mentioned control section seeks the above-mentioned target value which gives the maximum power among the above-mentioned plurality of output powers, and updates the above-mentioned operation target value based on the above-mentioned target value which gives the maximum power, and the above-mentioned memory section stores the above-mentioned operation target value and/or the above-mentioned target value which gives the maximum power for each the above-mentioned power generating mode.

By storing the operation target value and/or the target value which gives the maximum power, the present invention has an action capable of realizing a power supply apparatus which promptly makes transition to the most suitable operation target value at the next startup of the fuel cell, even when the fuel cell undergoes a secular change, or goes under various conditions such as temperature change, quantity of water of electrolysis membrane.

The target value which gives the maximum power may be searched only at startup, or only when power-generating mode is changed, or only at least once in the predetermined time. Preferably, the target value which gives the maximum power is to be searched at startup, when the power-generating mode is changed, and at least once in the predetermined time.

Furthermore, the power supply apparatus in accordance with the present invention from still another aspect is characterized in that a plurality of target values for power measurement are determined, centering on the present operation target value.

The present invention has an action capable of realizing a power supply apparatus which efficiently seeks the target value which gives the maximum power.

Furthermore, the power supply apparatus in accordance with the present invention from still another aspect is characterized in that in a case where the above-mentioned output power of the above-mentioned fuel cell in regard to a second target value for power measurement is larger than the output power of the above-mentioned fuel cell in regard to a first target value for power measurement, wherein the above-mentioned second target value for power measurement is larger than the above-mentioned first target value for power measurement, the output power of the above-mentioned fuel cell in regard to a third target value for power measurement which is still larger than the second target value for power measurement is measured, and in a case where the above-mentioned output power of the above-mentioned fuel cell in regard to the above-mentioned second target value for power measurement is smaller than the above-mentioned output power of the above-mentioned fuel cell in regard to the above-mentioned first target value for power measurement, the above-mentioned output power of the above-mentioned fuel cell in regard to the above-mentioned third target value for power measurement which is still smaller than the above-mentioned first target value for power measurement is measured.

Since the number of the target values for power measurement that should be measured in order to seek the target value which gives the maximum power can be reduced significantly, the present invention has an action capable of realizing a power supply apparatus which quickly seeks out the most suitable operation target value.

Furthermore, the power supply apparatus in accordance with the present invention from another aspect comprises a memory section for storing the changes of the above-mentioned target value which gives the maximum power, wherein the above-mentioned power supply apparatus is characterized in that, in a case where the above-mentioned target value which gives the maximum power has increased as to the change, the above-mentioned output power of the above-mentioned fuel cell is measured at the target value for power measurement which is larger than the present above-mentioned target value which gives the maximum power, and in a case where the above-mentioned target value which gives the maximum power has decreased as to the change, the above-mentioned output power of the above-mentioned fuel cell is measured at the above-mentioned target value for power measurement which is smaller than the present above-mentioned target value which gives the maximum power.

Since the number of the target values for power measurement that should be measured can be further reduced by predicting the secular change of the fuel cell with the use of the history of the target value which gives the maximum power, the present invention has an action capable of realizing a power supply apparatus which quickly seeks out the most suitable operation target value.

The case in which the target value which gives the maximum power of the fuel cell is increasing will be described as an example. When the operation target value coincide with the target value which gives the maximum power, initially, the target value for power measurement is considered as a value larger than the present operation target value (a target value which gives the maximum power), and the output power of the fuel cell is measured. When the operation target value does not coincide with the target value which gives the maximum power, in a typical case, initially the target value for power measurement is considered as a target value which gives the maximum power corresponding to the present operation target value (the target value which gives the maximum power which has been previously sought), and the output power of the fuel cell is measured. Then, after increasing the target value for power measurement, the output power of the above-mentioned fuel cell is measured.

Furthermore, the power supply apparatus in accordance with the present invention from still another aspect comprises a memory section for storing a target output power of the above-mentioned fuel cell for each above-mentioned power generating mode, wherein the above-mentioned power supply apparatus is characterized in that in a case where the finite difference between the above-mentioned output power of the above-mentioned fuel cell in regard to the above-mentioned target value which gives the maximum power or the above-mentioned operation target value corresponding to the above-mentioned target value which gives the maximum power, and the above-mentioned target output power, is not within the predetermined range, the above-mentioned control section changes the quantity of fuel to be supplied to the above-mentioned fuel cell so as to minimize that finite difference.

In a case where the fuel cell cannot supply predetermined power due to the secular change and the like, by making fine adjustments to quantity of fuel to be supplied and resetting the operation target value, the present invention has an action capable of realizing a power supply apparatus which supplies stable power even when the fuel cell undergoes the secular change.

Furthermore, the power supply apparatus in accordance with the present invention from still another aspect is characterized in that the above-mentioned fuel cell is a direct methanol fuel cell.

The present invention has an action capable of realizing a power supply apparatus which constantly seeks out the most suitable operation target value even in a case where the methanol constituent of fuel varies to some extent.

Furthermore, the power supply apparatus in accordance with the present invention from still another aspect is characterized in that the above-mentioned fuel cell is a balance type which balances fuel and the above-mentioned output power of the above-mentioned fuel cell.

In a direct methanol fuel cell type power supply apparatus in accordance with the present invention in which the fuel cell nearly uses up fuel, it is extremely important to operate with the most suitable operation target value. The present invention has an action capable of realizing a power supply apparatus which operates with an ideal balance since the power supply apparatus can seek out the most suitable operation target value under any conditions.

In a direct methanol fuel cell type power supply apparatus in accordance with the present invention in which the fuel cell nearly uses up fuel, it is easy to purify the discharge. The present invention has an action capable of realizing a power supply apparatus which is small, safe, with a clean discharge and a high fuel utilization ratio, using a methanol with toxicity.

Conventionally, there was no conception as to drive a fuel cell under the condition that quantity of methanol included in the discharge of the fuel cell comes to nearly zero. For example, the fuel cell system and method of controlling the fuel cell of the conventional art operated the fuel cell at the operating point with the highest energy conversion efficiency, under the condition of supplying a sufficient quantity of fuel to the fuel cell. Therefore, the operating condition of the fuel cell of the conventional art differs completely from the operating condition of the fuel cell of the present invention. Furthermore, the fuel cell system and method of controlling the fuel cell of the conventional art calculate the point with the highest energy conversion efficiency from a characteristic of output current-output voltage of the initial period, and did not consider the secular change and the like.

While the novel features of the invention are set forth particularly in the appended claims, the invention, both as to the organization and the content, will be better understood and appreciated, along with other objects and features thereof, from the following detailed description taken in conjunction with the drawings.

BRIEF DESCRIPTION OF DRAWINGS

FIG. 7 is a detailed flowchart of step 505 in FIG. 5.

Part or all of the drawings are drawn schematically for diagrammatic representation and it should be considered that they do not necessarily reflect relative size and position of components shown therein.

DETAILED DESCRIPTION OF THE INVENTION

Embodiments that specifically show the best mode for conducting the present invention will be described below with reference to figures.

<<First Embodiment>>

Figure 1:
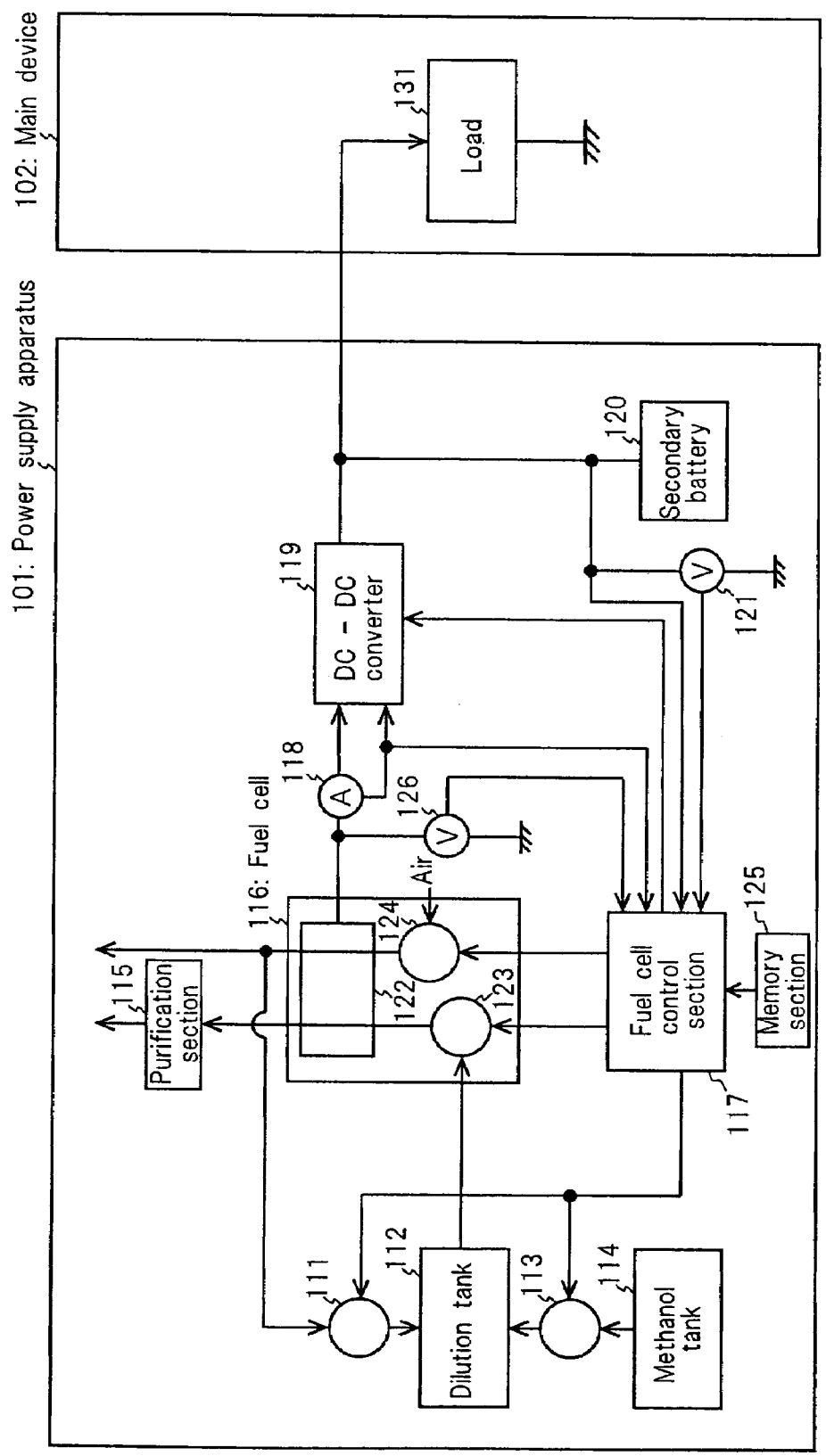
FIG. 1 is a block diagram showing the configuration of a power supply apparatus in accordance with the first embodiment of the present invention.

The power supply apparatus in accordance with the first embodiment will be described with reference to FIG. 1 to FIG. 8. FIG. 1 is a block diagram showing the configuration of a power supply apparatus in accordance with the first embodiment of the present invention. In FIG. 1, a reference numeral 101 denotes a power supply apparatus, and a reference numeral 102 denotes a main device. The power supply apparatus 101 comprises a return pump 111, a dilution tank 112, a methanol pump 113, a methanol tank 114, a purification section 115, a fuel cell 116, a fuel cell control section 117, a fuel cell output current detector 118 which detects the output current of the fuel cell 116 (the input current of a DC—DC converter 119), a DC—DC converter (power converter) 119, a secondary battery 120, a secondary battery output voltage detector 121 which detects the output voltage of the secondary battery 120, a memory section 125, and a fuel cell output voltage detector 126 which detects output voltage of the fuel cell 116 (the input voltage of the DC—DC converter 119). The fuel cell 116 comprises a stack 122, a fuel pump 123, and an air pump 124. The main device 102 comprises a load 131.

The fuel cell 116 is a balance type fuel cell using methanol for fuel (a non-circulation type direct methanol fuel cell, which balances the quantity of fuel to be used with the electric energy to be outputted). The secondary battery 120 is a lithium ion secondary battery. The capacity of the secondary battery 120 is 16 Wh. Methanol ($CH_3OH$) of a several to a 100% concentration is stored in the methanol tank 114. The main device 102 is a personal computer.

The power outputted from the fuel cell 116 is controlled at the DC—DC converter 119 so that it comes to the target current. In a case where there is a surplus of power outputted from the fuel cell 116 (the DC—DC converter 119) even when the enough power is supplied to the main device 102, the power supply apparatus 101 supplies the power outputted from the fuel cell 116 to the main device 102, and charges the secondary battery 120 with the surplus power. In a case where power outputted from the fuel cell is lacking power to supply enough the main device 102, the secondary battery 120 discharges the lacking power. The power supply apparatus 101 supplies the power combined the power outputted from the fuel cell 116 and the power discharged by the secondary battery 120 to the main device 102.

The fuel cell control section 117 has three power generating modes, and supplies to the fuel cell 116 a certain quantity of fuel per unit hour which varies according to each power-generating mode. The fuel cell control section 117 seeks the residual capacity of the secondary battery 120 from the output voltage of the secondary battery 120 detected by the secondary battery output voltage detector 121. The fuel cell control section 117 selects the power-generating mode (controls the output power of the fuel cell 116) based on the residual capacity of the secondary battery 120 (details will be hereinafter described). The fuel cell control section 117 indicates to the DC—DC converter 119 of the value of the input target current corresponding to the chosen power-generating mode. As will be described below, in a case where a certain quantity of fuel is supplied to a fuel cell, the relations between the output voltage and the output current of the fuel cell will be represented as a certain function on a graph. The DC—DC converter 119 controls the output current of the fuel cell 116 detected by the fuel cell output current detector 118 (the input current of the DC—DC converter 119), so that the output current coincides with the input target current as much as possible. That is, the fuel cell 116 outputs a predetermined output power (=output current of the fuel cell 116×output voltage corresponding to that output current), and the DC—DC converter 119 converts the output power of the fuel cell 116 and supplies to the load 131 and/or the secondary battery 120.

More specifically, the fuel cell control section 117 uses the return pump 111, the methanol pump 113, the fuel pump 123, and the air pump 124 to adjust the quantity of fuel to be supplied to the fuel cell 116 and the quantity of air. The methanol pump 113 pumps methanol into the dilution tank 112 from the methanol tank 114 based on a command by the fuel cell control section 117. The dilution tank 112 dilutes methanol of a several to a 100% concentration to 6% wt methanol. The fuel pump 123 pumps the diluted methanol from the dilution tank 112 into the stack 122, based on a command by the fuel cell control section 117. The air pump 124 pumps air into the stack 122 based on a command by the fuel cell control section 117.

In the stack 122, methanol is supplied to the fuel electrode (−), and air is supplied to the air electrode (+). At the fuel electrode (−), methanol reacts with water and turns into carbon dioxide, hydrogen ions, and electrons ($CH_3OH+H_2O \rightarrow CO_2+6H^++6e^-$). Hydrogen ions pass across a polymer membrane, while electrons pass across an external load, and both hydrogen ions and electrons reach the air electrode (+). At the air electrode (+), hydrogen ions come in contact with atmospheric oxygen, deprives electrons from electrode surface and reacts, turning into water ($3/2O_2+6H^++6e^- \rightarrow 3H_2O$).

The stack 122 discharges 0.5% wt methanol which is spent and further diluted, carbon dioxide, and water from the fuel electrode (−) side. The purification section 115 turns the discharged methanol into carbon dioxide and water by a catalyst to purify the discharged methanol. The stack 122 discharges water and air from the air electrode (+) side. The return pump 111 pumps the water discharged from the air electrode (+) side into the dilution tank 112. Water discharged from the air electrode (+) side is reused as solvent for diluting methanol in the dilution tank 112.

Figure 2:
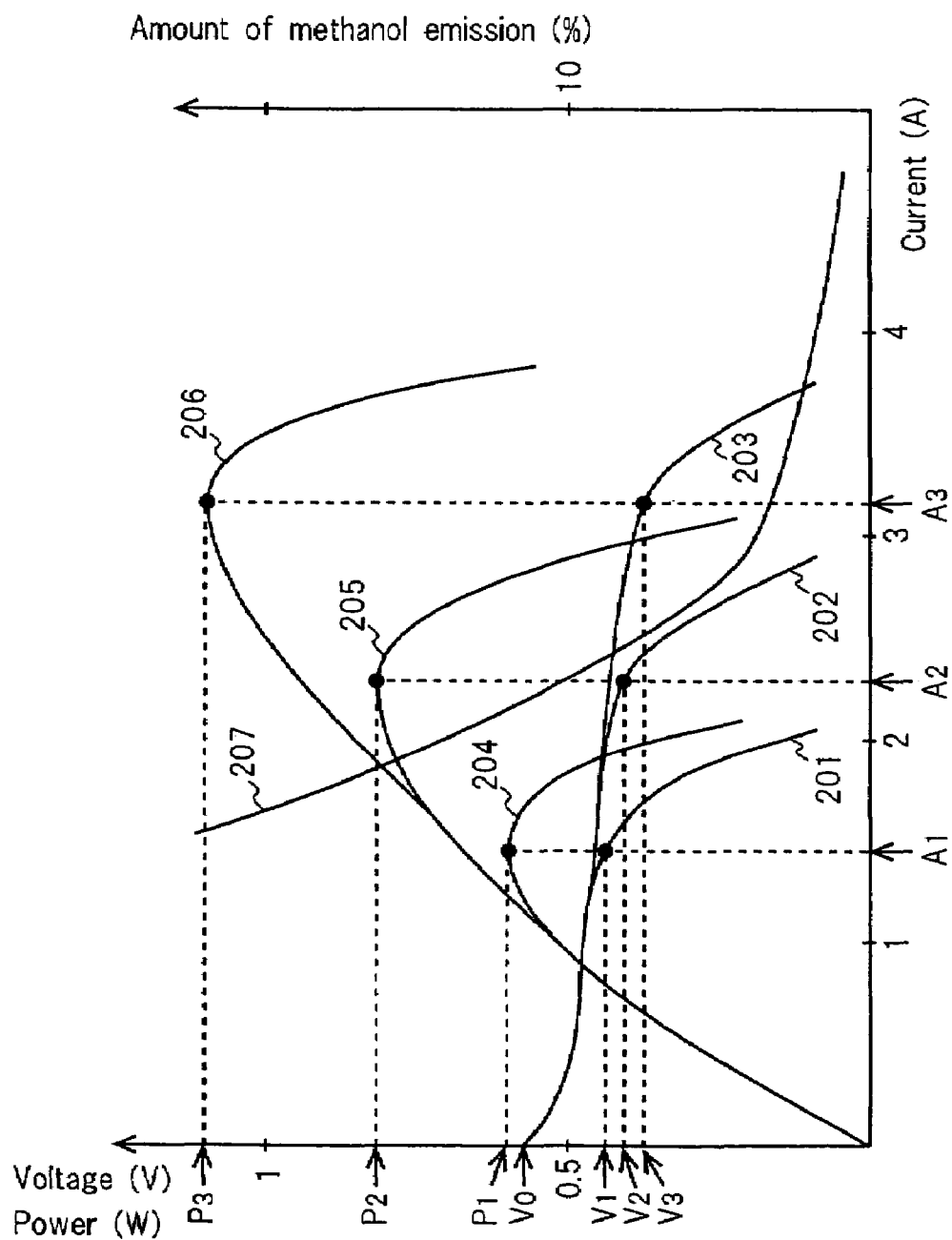
FIG. 2 shows the characteristics of output current-output voltage, the characteristics of output current-output power and the characteristics of output current-methanol discharge rate according to quantity of fuel of a balance type fuel cell used in the power supply apparatus in accordance with the first embodiment of the present invention.

FIG. 2 shows the characteristics of output current-output voltage, the characteristics of output current-output power and the characteristics of output current-methanol discharge rate of the fuel cell 116 according to quantity of fuel of a balance type fuel cell used in the power supply apparatus in accordance with the first embodiment of the present invention. In FIG. 2, the horizontal axis is output current scale (A), and the vertical axis is output voltage scale (V) and output power scale (W). Lines 201, 202 and 203 shows the characteristics of output current-output voltage in a case where quantity of fuel is supplied at 0.1 cc/min, 0.2 cc/min and 0.3 cc/min, respectively. Lines 204, 205 and 206 shows the characteristics of output current-methanol discharge rate in a case where the quantity of fuel is supplied at 0.1 cc/min, 0.2 cc/min and 0.3 cc/min, respectively. Line 207 shows the methanol discharge rate which the fuel cell 116 discharges in a case where quantity of fuel is supplied at 0.3 cc/min. The characteristics of output current-output voltage and the characteristics of output current-output power of the fuel cell 116 vary according to the quantity of fuel to be supplied to the fuel cell 116. When the quantity of fuel is fixed at a certain value, the characteristic of output current-output voltage and the characteristic of output current-output power at that quantity of fuel are uniquely fixed.

In FIG. 2, in a case where quantity of fuel is supplied at 0.1 cc/min, the output current value at the point with the maximum output power outputted from the fuel cell 116 is $A_1$, and the output electric energy (the target electric energy) at the point with the maximum output power outputted from the fuel cell 116 is $P_1$. In the case where quantity of fuel is supplied at 0.2 cc/min, the output current value at the point with the maximum output power outputted from the fuel cell 116 is $A_2$, and the output electric energy (the target electric energy) at the point with the maximum output power outputted from the fuel cell 116 is $P_2$. In the case where quantity of fuel is supplied at 0.3 cc/min, the output current value at the point with the maximum output power outputted from the fuel cell 116 is $A_3$, and the output electric energy (the target electric energy) at the point with the maximum output power outputted from the fuel cell 116 is $P_3$. The power supply apparatus 101 in accordance with the first embodiment conducts constant-current control over the output of the fuel cell 116.

In a case where the quantity of fuel is supplied at 0.3 cc/min will be described below. In regard to the characteristic of output current-output power 206, in a case where the output current is 0 to $A_3$ (A), the power increases as the output current increases. When the output current is $A_3$ (A), the power comes to maximum. When the output current is larger than $A_3$ (A), the power drastically decreases as the output current increases.

Also in regard to the characteristic of output current-output voltage 203, in a case where the output current is 0 to $A_3$ (A), the voltage somewhat decreases as the output current increases but retains a stable voltage. When the output current is larger than $A_3$ (A), the declining rate of the output voltage increases as the output current increases.

In regard to the methanol discharge rate 207, the quantity of methanol to be discharged (quantity of methanol remaining in the discharge of the fuel cell 116) decreases as the output current of the fuel cell 116 increases from 0 to $A_3$ (A). At the point when the output current is $A_3$ (A), quantity of methanol to be discharged is minute. Thereafter, quantity of methanol to be discharged slightly decreases as output current further increases.

In other words, in a case where the output current is in the range of 0 to $A_3$ (A), the fuel cell 116 cannot use up the supplied methanol, therefore the fuel cell 116 discharges the remaining methanol. When the output current is equal to or more than $A_3$ (A), the fuel cell 116 nearly uses up the supplied methanol, therefore the fuel cell 116 discharges only a minute quantity of methanol. When the output current is larger than $A_3$ (A) by the predetermined quantity or over, the output voltage of the fuel cell 116 drops drastically. The same is true of the case where quantity of fuel is supplied at 0.2 cc/min or 0.1 cc/min.

The balance type fuel cell in accordance with the first embodiment of the present invention supplies a certain quantity of fuel per unit time to the fuel cell 116 in each power generating mode, and generates power within the range of the current value from the current value with the maximum output power at that quantity of fuel, to the current value which is larger than that current value by the predetermined value. Such range is determined depending on the quantity of fuel. Therefore, nearly the entire supplied methanol is used up, and only a minute quantity of methanol is discharged.

The memory section 125, based on the diagram of the characteristics of output current-output voltage and the characteristics of output current-output power with quantity of fuel as parameter (e.g. FIG. 2), correlates and stores a certain quantity of fuel supplied per unit time to the fuel cell 116 in each power generating mode, an output current value with the maximum output power at that quantity of fuel (hereinafter will refer to as "the target value which gives the maximum power"), and a target value of the current value which is to be actually outputted to the fuel cell 116 (hereinafter will refer to as "the operation target value". The value ranging from the target value (the current value) for giving the maximum power, to the current value which is larger by the predetermined value (the current value before the output voltage drops drastically) than that target value which gives the maximum power), and the target output power of the fuel cell 116. The memory section may store the relational expression between the operation target value and the target value which gives the maximum power, and store either one of the operation target value or the target value which gives the maximum power.

The fuel cell control section 117 indicates to the DC—DC converter 119 of the target output current value (the operation target value) corresponding to the quantity of fuel. For example, in a case where methanol is supplied to the stack 122 with the quantity of fuel supplied at 0.3 cc/min, the fuel cell control section 117 indicates the operation target value to the DC—DC converter 119 based on the above-mentioned characteristic diagram, so that the output current value of the fuel cell 116 comes to a value within the range of $A_3$ to $A_3+\alpha_0$ ($\alpha_0$ is a positive value) (the target value which gives the maximum power is $A_3$, and for example, the operation target value is $A_3+\alpha_1$ ($0<\alpha_1<\alpha_0$)).

Figure 3:
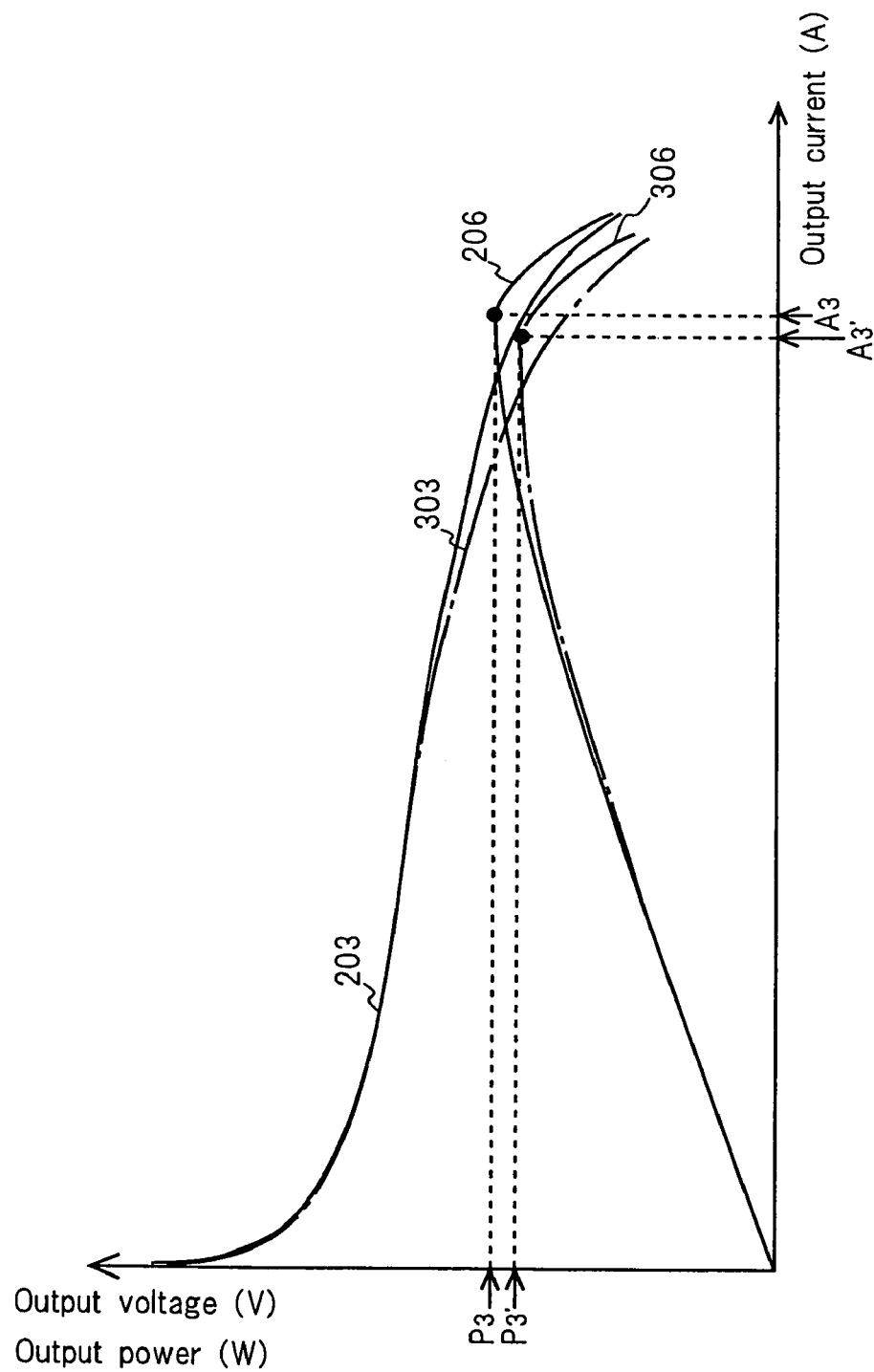
FIG. 3 shows the characteristics of output current-output voltage and the characteristics of output current-output power at an initial period and after the secular change of a balance type fuel cell used in the power supply apparatus in accordance with the first embodiment of the present invention (in a case where quantity of fuel is supplied at 0.3 cc/min).

FIG. 3 is a diagram showing characteristics of output current-output voltage and characteristics of output current-output power at an initial period and after the secular change of a balance type fuel cell used in the power supply apparatus in accordance with the first embodiment of the present invention (in a case where the quantity of fuel is 0.3 cc/min). In FIG. 3, the horizontal axis is output current scale (A), and the vertical axis is output voltage scale (V) and an output power (W). Lines 203, 206 show the characteristic of output current-output voltage and the characteristic of output current-output power at an initial period. Lines 303, 306 show the characteristic of output current-output voltage and the characteristic of output current-output power after the secular change.

In FIG. 3, in a case where the quantity of fuel is supplied at 0.3 cc/min, the output current value at the point with the maximum output power of the fuel cell 116 at the initial period is $A_3$, and output electric energy at the point with the maximum output power of the fuel cell 116 at the initial period is $P_3$. In a case where quantity of fuel is supplied at 0.3 cc/min, the output current value at the point with the maximum output power of the fuel cell 116 after the secular change is $A_3'$, and output electric energy at the point with the maximum output power of the fuel cell 116 after the secular change is $P_3'$.

The characteristics of output current-output voltage and the characteristics of output current-output power of the fuel cell 116 vary according to the secular change of the fuel cell 116. In FIG. 3, maximum electric energy $P_3'$ after the secular change is smaller than the maximum electric energy $P_3$ at the initial period. The fuel cell 116 after the secular change can generate only smaller power than the power which the fuel cell control section 117 indicates. Furthermore, the current value $A_3'$ at the maximum power after the secular change is smaller than the current value $A_3$ at the maximum power in the initial period. When the fuel cell 116 after the secular change is operated with an output current value of $A_3+\alpha_1$, the fuel cell 116 can generate only a still smaller power.

The characteristics of output current-output voltage and the characteristics of output current-output power of the fuel cell 116 vary according to temperature of the fuel cell or quantity of water of electrolysis membrane of the fuel cell and the like, besides the secular change of the fuel cell. The power supply apparatus of the present invention adaptively determines the operating point (the operation target value) in accordance with such characteristic change of the fuel cell 116.

The control method of a power supply apparatus in accordance with the first embodiment will be described below. The control method of a power supply apparatus in accordance with the first embodiment of the present invention is a control method in which the fuel cell 116 can maintain constant output power as much as possible.

Figure 4:
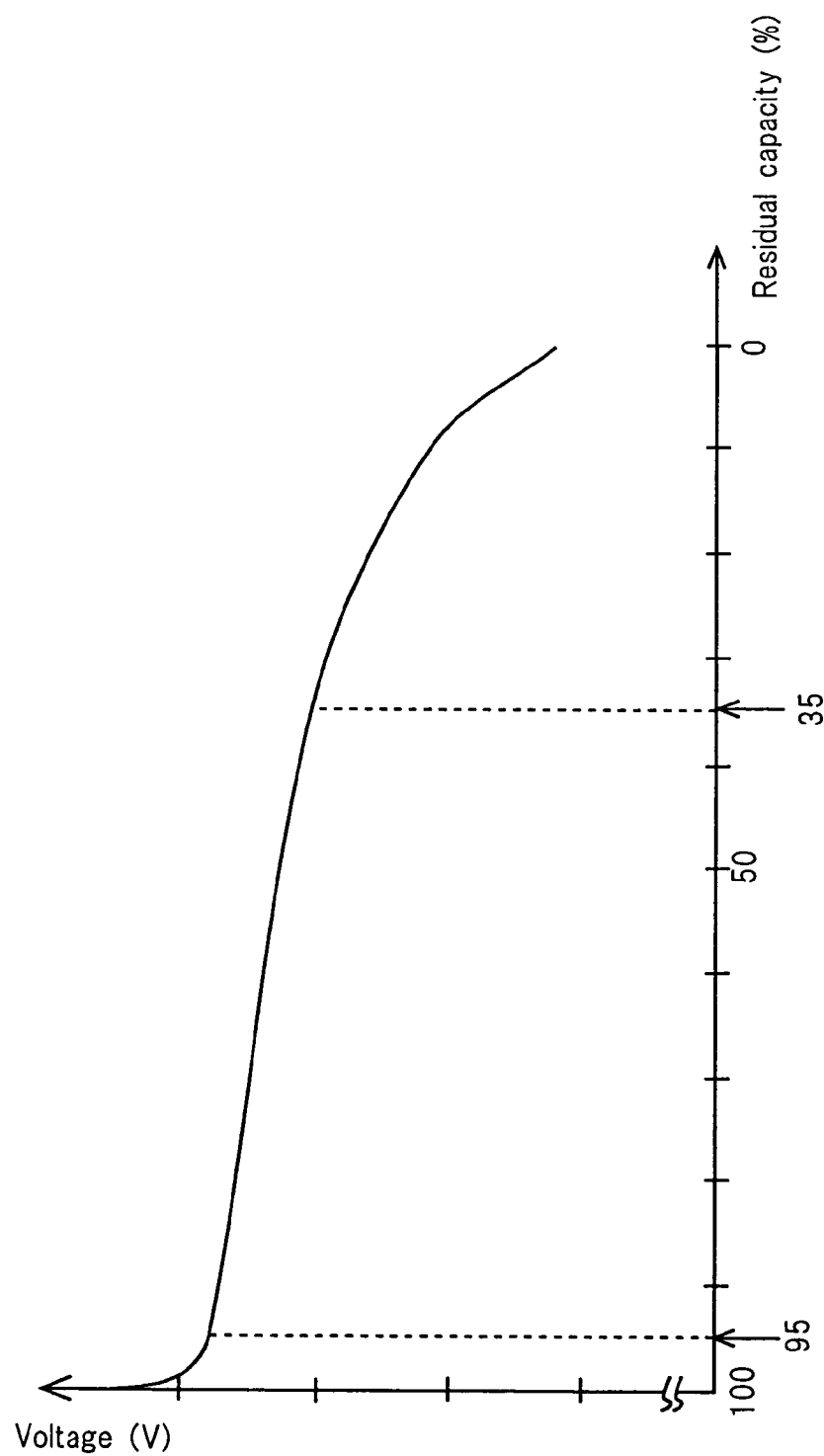
FIG. 4 shows an electrical discharge characteristic of a typical secondary battery.

FIG. 4 is a diagram showing a characteristic of electrical discharge (a characteristic of residual capacity-voltage) of a typical secondary battery (e.g. a lithium battery). In FIG. 4, the horizontal axis is residual capacity scale (%), and the vertical axis is output voltage scale (V). As shown in FIG. 4, when the output voltage of the secondary battery 120 is detected, the residual capacity of the secondary battery 120 can be decided. In order to prevent the fuel cell 120 from overcharge or overdischarge, or to make the secondary battery 120 to constantly have an electric energy to the extent capable of solely supplying power to the load, for example, until the fuel cell 116 is ready to supply power at the startup of the fuel cell 116, the power supply apparatus 101 in accordance with the first embodiment of the present invention controls the residual capacity of the secondary battery 120 to be within 35% to 95%.

Method of determining the power-generating mode of a fuel cell of a power supply apparatus in accordance with the first embodiment will be described below.

When the main device 102 is powered on, the fuel cell control section 117 puts the fuel cell 116 in a 3 W power-generating mode until the temperature of the stack 122 rises to 40 C. to 60 C. (In general, it takes about 15 minutes to reach this temperature after the power-on). After the temperature of the stack 122 rises to 40 C. to 60 C., the fuel cell control section switches to the normal power generating mode control. In the normal power generating mode control, when the residual capacity SOC of the secondary battery 120 reaches 95%, the fuel cell control section 117 puts the fuel cell 116 in a 3 W power-generating mode. When the residual capacity SOC of the secondary battery 120 reaches 65% in the 3 W power-generating mode, the fuel cell control section 117 puts the fuel cell 116 in a 13 W power-generating mode. When the residual capacity SOC of the secondary battery 120 comes to 35%, the fuel cell control section 117 puts the fuel cell 116 in a 17 W power-generating mode. When the residual capacity SOC of the secondary battery 120 reaches 65% in the 17 W power-generating mode, the fuel cell control section 117 puts the fuel cell 116 in a 13 W power-generating mode.

Subsequently, the operating method of a power supply apparatus in accordance with the first embodiment capable of handling the secular change and the like will be described below. The operating method of a power supply apparatus in accordance with the first embodiment is a method which makes fine adjustments with the output current of the fuel cell 116 at short time intervals $T_1$, makes fine adjustments with the quantity of fuel to be supplied to the fuel cell 116 at long time intervals $T_2$, maintaining the most suitable operating point and the target electric energy. In this embodiment, $T_1$ is set as 10 minutes and $T_2$ is set as 100 minutes.

Figure 5:
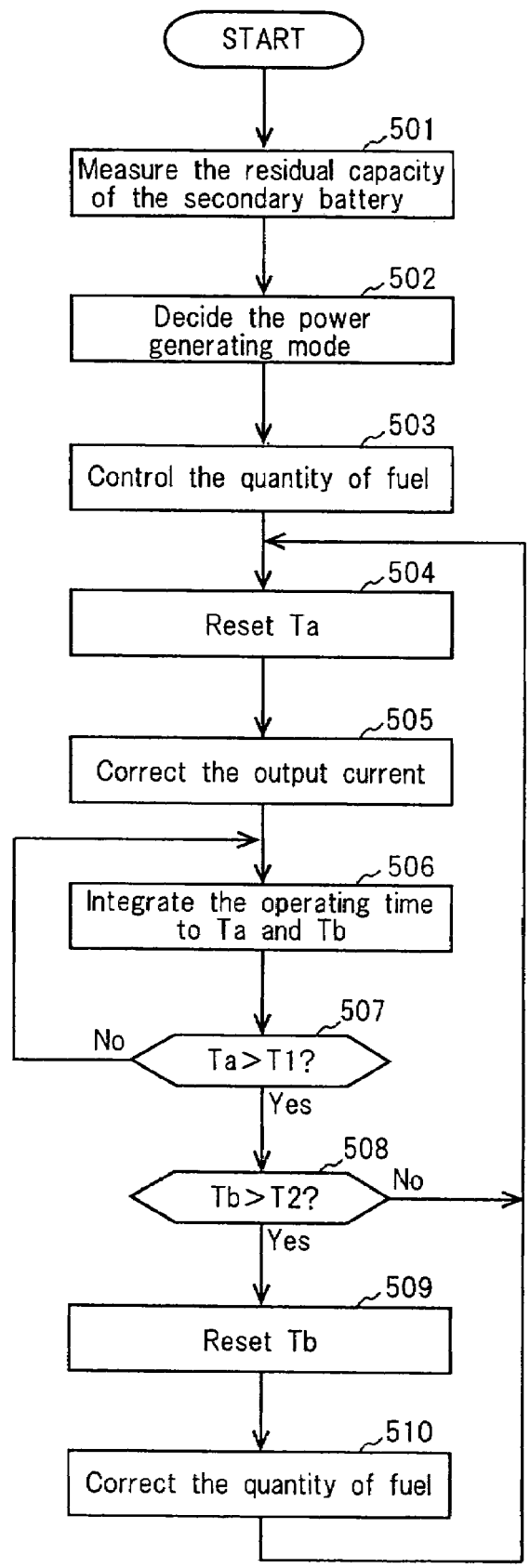
FIG. 5 is a flowchart showing the operating method of the fuel cell of a power supply apparatus in accordance with the first and second embodiment of the present invention.

FIG. 5 is a flowchart showing the operating method of the fuel cell of a power supply apparatus in accordance with the first embodiment the present invention. At step 501, the fuel cell control section 117 seeks the residual capacity of the secondary battery 120 from the output voltage of the secondary battery 120, detected by the secondary battery output voltage detector 121. At step 502, the fuel cell control section 117 decides the power-generating mode using the above-mentioned method, based on the residual capacity and the like of the secondary battery 120. At step 503, the fuel cell control section 117 makes the fuel pump 123 and the air pump 124 supply the pre-determined quantity of fuel and air corresponding to the quantity of fuel to the fuel cell 116, in accordance with the decided power generating mode.

At step 504, the fuel cell control section 117 resets the timer Ta. At step 505, the power supply apparatus 101 examines the relations between the output current (the input current of the DC—DC converter 119) and the output power of the fuel cell 116, and corrects the output current of the fuel cell 116 (the input target current of the DC—DC converter 119) (details will be described with reference to FIG. 6 and FIG. 7). At step 506, the operating time of the fuel cell 116 will be integrated to the timer Ta and Tb. At step 507, the fuel cell control section 117 determines whether the timer Ta is larger than the predetermined value $T_1$ or not. While the timer Ta is equal to or less than the predetermined value $T_1$, return to step 506 and repeat the process.

When the timer Ta is larger than the predetermined value $T_1$, go to step 508, and the fuel cell control section 117 determines whether the timer Tb is larger than $T_2$ or not. While the timer Tb is equal to or less than the predetermined value $T_2$, return to step 504 and repeat the process.

When the timer Tb is larger than the predetermined value $T_2$, go to step 509, and the fuel cell control section 117 resets the timer Tb. At step 510, the power supply apparatus 101 compares the generated output power (the output current) and the present target value of the fuel cell 116, and in a case where the difference is not within the predetermined range, corrects the quantity of fuel (details will be described with reference to FIG. 8). Return to step 506 and repeats the process.

Figure 6:
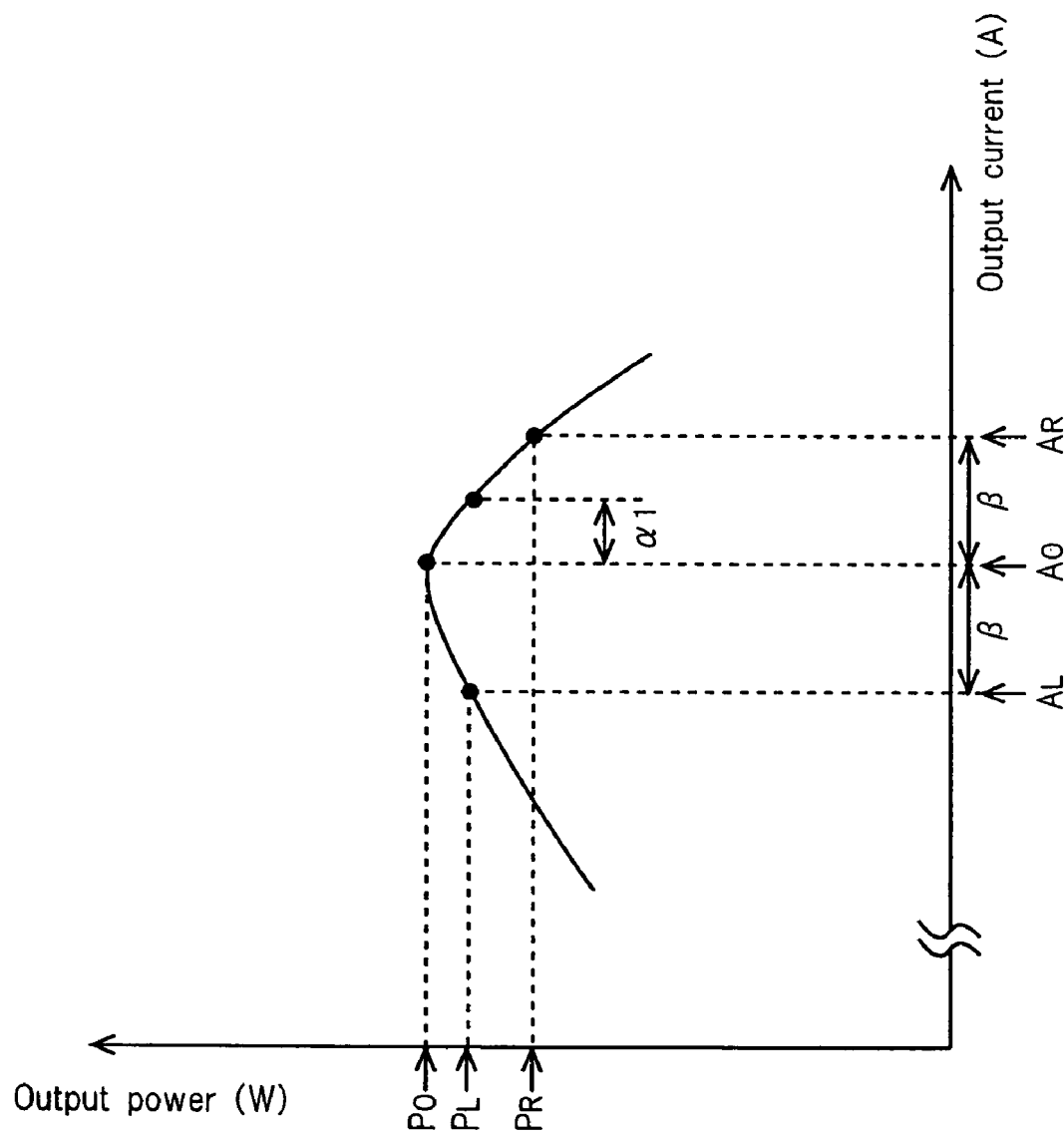
FIG. 6 shows the method for seeking the point with the maximum power with a certain quantity of fuel in a power supply apparatus in accordance with the first and second embodiment of the present invention.

With reference to FIG. 6 and FIG. 7, the correcting method using the output current of the fuel cell 116 at step 505 in FIG. 5 will be described below. This correcting method is a method in which the power supply apparatus searches the point with the maximum power in the present quantity of fuel at predetermined intervals $T_1$, determines the most suitable operating point based on the searched point, and makes the fuel cell 116 to generate power at the most suitable output current (the operation target value or the input current of the DC—DC converter 119).

In FIG. 6, in regard to the present power generating mode, the output current value of the fuel cell 116 corresponding to the maximum power (initially, the target value which gives the maximum power, which is stored in memory 125) is defined as the current value $A_O$ which is to be a criterion, the output current value which is smaller than the output current value $A_O$ by $\beta$ ($\beta$ is a positive value) is defined as $A_L$, and the output current value which is larger than the output current value $A_O$ by $\beta$ is defined as $A_R$. At step 505, the fuel cell control section 117 measures the output power of the fuel cell 116 at these three points (the target values for power measurement). The output electric energy of output current value $A_O$ is defined as $P_O$, the output electric energy of output current value $A_L$ is defined as $P_L$, and the output electric energy of output current value $A_R$ is defined as $P_R$. For example, in a case where the output electric energy $P_O$ is larger than both the output electric energy $P_L$ and the output electric energy $P_R$ (e.g. FIG. 6), the fuel cell control section 117 determines the current value $A_O$ which is the criterion as the point with the maximum power. Otherwise, the fuel cell control section 117 defines the current value with the maximum power among the three points as output current value to be the new criterion, and repeats the process mentioned above. Thus, the fuel cell control section 117 searches the point with the maximum output power of the fuel cell 116. The output current corresponding to the maximum power of the fuel cell 116 which has been sought, is defined as the target value which gives the maximum power, and a value wherein the predetermined value $\alpha_1$ is added to the target value which gives the maximum power, is defined as the operation target value.

FIG. 7 is a detailed flowchart of step 505 in FIG. 5. The fuel cell 116 is assumed as generating power in the present output current value (the operation target value, $A_O+\alpha_1$). The target value $A_O$ (the value wherein the current value $\alpha_1$ is subtracted from the operation target value) which gives the maximum power corresponding to the operation target value, is defined as the criterion value. At step 701, the fuel cell control section 117 measures the present output electric energy $P_O$ of the fuel cell 116. The fuel cell control section 117 measures the output electric energy $P_O$, by multiplying the current value detected by the fuel cell output current detector 118, with the voltage value detected by the fuel cell output voltage detector 126. At step 702, the fuel cell control section 117 indicates the target current value $A_L$ ($=A_O-\beta$) to the DC—DC converter 119. The DC—DC converter 119 controls the output current so that the input current value comes to the target input current value $A_L$. After a lapse of the time required to stabilize the operation of the fuel cell, for example, after a lapse of one minute, at step 703, the fuel cell control section 117 measures output electric energy $P_L$ when the output current value of the fuel cell 116 is $A_L$. At step 704, the fuel cell control section 117 determines whether the output electric energy $P_O$ is larger than the output electric energy $P_L$ or not.

Regarding step 704, in a case where output electric energy $P_O$ is a value equal to or larger than the output electric energy $P_L$, go to step 705, and the fuel cell control section 117 indicates the target current value $A_R$ ($=A_O+\beta$) to the DC—DC converter 119. The DC—DC converter 119 controls the output current so that the input current value comes to the target input current value $A_R$. After a lapse of one minute, at step 706, the fuel cell control section 117 measures the output electric energy $P_R$ when the output current value of the fuel cell 116 is $A_R$. At step 707, the fuel cell control section 117 determines whether or not the output electric energy $P_O$ is equal to or larger than the output electric energy $P_R$. Regarding step 707, in a case where the output electric energy $P_O$ is a value smaller than the output electric energy $P_R$, go to step 708, and the fuel cell control section 117 shifts the output current value $A_O$ which is a criterion to the right. Namely, these equations, $A_L=A_O$, $P_L=P_O$, $A_{O=AR}$, $P_O=P_R$, and $A_R=A_R+\beta$, are applied. Returns to step 705 and repeats the process.

Regarding step 704, in a case where the output electric energy $P_O$ is a value smaller than the output electric energy $P_L$, go to step 709, and the fuel cell control section 117 shifts the output current value $A_O$ which is a criterion to the left. Namely, these equations, $A_R=A_O$, $P_R=P_O$, $A_O=A_L$, $P_O=P_L$, and $A_L=A_L-\beta$, are applied. At step 710, the fuel cell control section 117 indicates the target current value $A_L$ to the DC—DC converter 119. The DC—DC converter 119 controls the output current so that the input current value comes to the target input current value $A_L$. After a lapse of one minute, at step 711, the fuel cell control section 117 measures output electric energy PL when the output current value of the fuel cell 116 is $A_L$. At step 712, the fuel cell control section 117 determines whether or not output electric energy $P_O$ is equal to or larger than output electric energy $P_L$. Regarding step 712, in a case where output electric energy $P_O$ is the value smaller than the output electric energy $P_L$, return to step 709 and repeat the process.

In a case where, regarding step 707, the output electric energy $P_O$ is a value equal to or larger than the output electric energy $P_R$, or in a case where, regarding step 712, the output electric energy $P_O$ is the value equal to or larger than the output electric energy $P_L$, go to step 713, and the fuel cell control section 117 sets the criterion value (the current value) $A_O$ in which the output electric energy $P_O$ comes to maximum as the new target value which gives the maximum power. The value which is added a predetermined value $\alpha_1$ to the target value which gives the maximum power is determined as the most suitable operation point (the operation target value) of the fuel cell 116. At step 714, the fuel cell control section 117 stores the operation target value and the target value which gives the maximum power in the memory section 125, and ends this flowchart.

As shown in FIG. 3, the output current value of the point with the maximum power tends to be small due to the secular change. Therefore, the fuel cell control section 117 of the present invention measures the output electric energy $P_L$ of the output current value $A_L$ (=$A_O-\beta$ ($\beta$ a is a positive value)) which is smaller than the output current value $A_O$ wherein the output value $A_O$ is set as a criterion, before measuring the output electric energy $P_R$. In a case where the output current value of the point with the maximum power tends to be large due to the secular change, the fuel cell control section 117 measures the output electric energy $P_R$ of a output current value $A_R$ (=$A_O+\beta$ ($\beta$ is a positive value)) which is larger than the output current value $A_O$ wherein output value $A_O$ is set as a criterion, before measuring the output electric energy $P_L$. Furthermore, the fuel cell control section 117 may store the history information of the target value which gives the maximum power in the memory section 125, and measure in advance whatever side in which the target value which gives the maximum power has higher possibility of shifting based on the stored information. Furthermore, the fuel cell control section may measure the temperature of the fuel cell 116 at the time of updating the target value which gives the maximum power, store that temperature information in the memory section 125, estimate the side in which the target value which gives the maximum power has higher possibility of shifting based on temperature dependency of the target value which gives the maximum power of the fuel cell 116, and measures that side in advance.

For the fuel cell 116, in general, it takes about one minute to stabilize the output voltage after changing the output current.

Apart from the present invention wherein the fuel cell 116 sets the target value (the output current value) $A_O$ which gives the maximum power that was previously sought as a criterion, and gradually expands the measuring range when the point with the maximum power cannot be detected, alternatively the fuel cell 116 may estimate the point with the maximum power from the inclination of the output electric energy (derivative value) which sets the output current as the parameter, and measure.

The fuel cell 116 in the present invention decides the point with the maximum power using three points. Alternatively four or more points may be used in order to further raise the precision.

Figure 8:
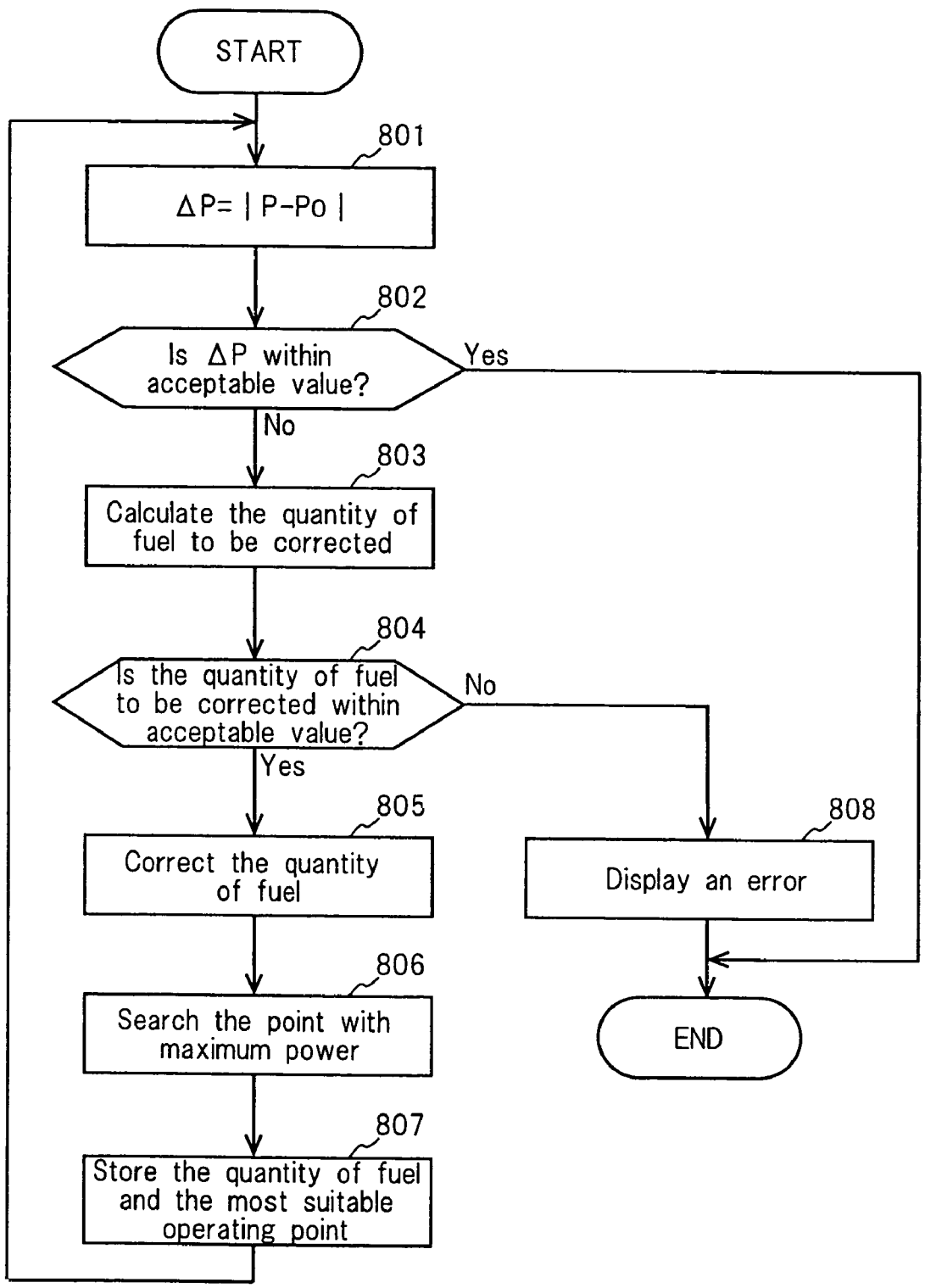
FIG. 8 is a detailed flowchart of step 510 in FIG. 5.

With reference to FIG. 8, the correcting method using quantity of fuel to be supplied to the fuel cell 116 at step 510 in FIG. 5 will be described below. This correcting method is a method in which the power supply apparatus changes quantity of fuel for power generation when actual output electric energy of the fuel cell 116 deviates from the target electric energy beyond the predetermined range, controlling so that the fuel cell 116 constantly generates power which is approximately the target electric energy.

FIG. 8 is a detailed flowchart of step 510 in FIG. 5. At step 801, the fuel cell control section 117 seeks absolute value of difference P between the target electric energy P and the present output electric energy $P_O$. At step 802, the fuel cell control section 117 determines whether P is within acceptable values or not. When the value is within acceptable values, the power supply apparatus ends this flowchart.

Regarding step 802, when P is not within acceptable values, go to step 803. At step 803, the fuel cell control section 117 calculates the quantity of fuel which will correct it based on P using a predetermined function. At step 804, the fuel cell control section 117 determines whether the corrected quantity of fuel is within acceptable values or not. When the value is not within acceptable values, go to step 808. At step 808, the power supply apparatus 101 displays an error, and ends this flowchart.

Regarding step 804, when corrected quantity of fuel is within acceptable values, go to step 805. At step 805, the fuel cell control section 117 makes the fuel pump 123 and the air pump 124 supply to the fuel cell 116 the quantity of fuel which is corrected and air corresponding to the quantity of fuel.

After a lapse of predetermined time from changing the quantity of fuel, at step 806, the fuel cell control section 117 searches the point with the maximum output power (the same process as in FIG. 7). At step 807, the fuel cell control section 117 stores the most suitable quantity of fuel and the most suitable operating point for that power generating mode in memory 125. Return to step 801 to repeat the process.

In regard to the first embodiment, the power supply apparatus is capable of constantly supplying a stable power by changing the operating point in response to the change in the characteristic of output current-output power due to the secular change of the fuel cell and the like. The quantity of methanol that the fuel cell 116 discharges can be reduced to extremely small quantities.

In regard to FIG. 8, the fuel cell control section 117 controls the output electric energy so that the difference between the target electric energy P and the present output electric energy $P_O$ will be within the predetermined range. Alternatively, when the maximum electric energy is measured, the fuel cell control section may control the maximum electric energy so that the difference between that the maximum electric energy and the target electric energy $P_O$ will be within the predetermined range.

The fuel utilization ratio of a circulation type fuel cell of the conventional art and the balance type fuel cell in accordance with the first embodiment of the present invention are compared. Effective electric energy and lost electric energy are designated, setting the 100% as the electric energy in a case where supplied methanol was converted to power without any loss. The point where the circulation type fuel cell of the conventional art and the balance type fuel cell in accordance with the first embodiment of the present invention differ remarkably is the loss due to evaporation at the time of isolation. In the circulation type fuel cell of the conventional art, when carbon dioxide was discharged, methanol was discharged along with it, since it is difficult to divide and discharge only the carbon dioxide. Accordingly, in the circulation type fuel cell of the conventional art, 28% of supplied methanol was lost due to evaporation at the time of isolation. Since exhausting such a large quantity of toxic methanol as it is into air is unacceptable, some measures to purify a large quantity of methanol (for turning the methanol into carbon dioxide and water) were required.

On the other hand, as shown in FIG. 2, the balance type fuel cell in accordance with the first embodiment of the present invention generates power within the range of the current value ranging from the current value with the maximum output power, to the current value which is larger than that current value by only the predetermined value. Therefore, nearly all the supplied methanol is used up, and only a minute quantity of methanol is discharged. Accordingly, the balance type fuel cell in accordance with the first embodiment of the present invention has only 2% of carry-over loss in the supplied methanol. The minute quantity of methanol which is discharged can be easily purified in the purification section 115.

As a result, in contrast to the effective electric energy of the circulation type fuel cell of the conventional art being 7.6% (lost electric energy is 92.4%), the effective electric energy of the balance type fuel cell in accordance with the first embodiment of the present invention will be 15.9% (lost electric energy is 84.1%). The balance type fuel cell of in accordance with the first embodiment of the present invention could supply twice as much power or more than the conventional fuel cell with the same quantity of fuel.

As can be understood from the characteristic of output current-output voltage in FIG. 2, when the output current comes to larger than the above-mentioned range of the output current even if only slightly, the output voltage drops drastically. Therefore, drastic fluctuation in the output current of the fuel cell is not preferable since there is the risk of a drastic drop in the output voltage. In this embodiment, the fuel cell 116 needs only to supply a certain level of power for a certain power-generating mode, since drastic change in the power to be supplied to a load will be corresponded by the secondary battery 120. In the first embodiment, it is highly possible to maintain the output current to be approximately the same with the target output current value (the value within the range of the current value from the current value with the maximum output power at that quantity of fuel, to the current value which is larger than that current value by only the predetermined value).

<<Second Embodiment>>

Figure 9:
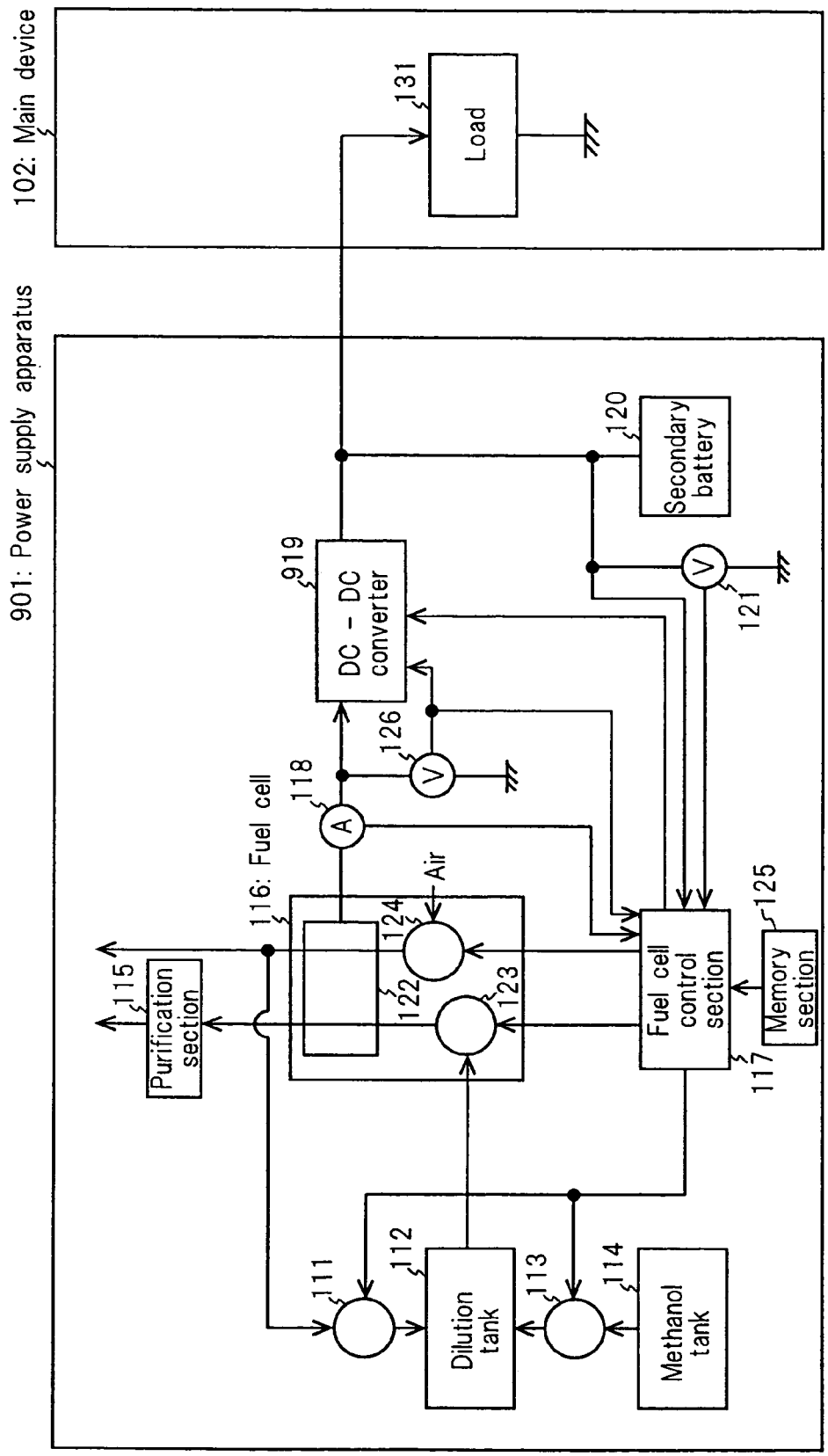
FIG. 9 is a block diagram showing the configuration of a power supply apparatus in accordance with the second embodiment of the present invention.
Figure 10:
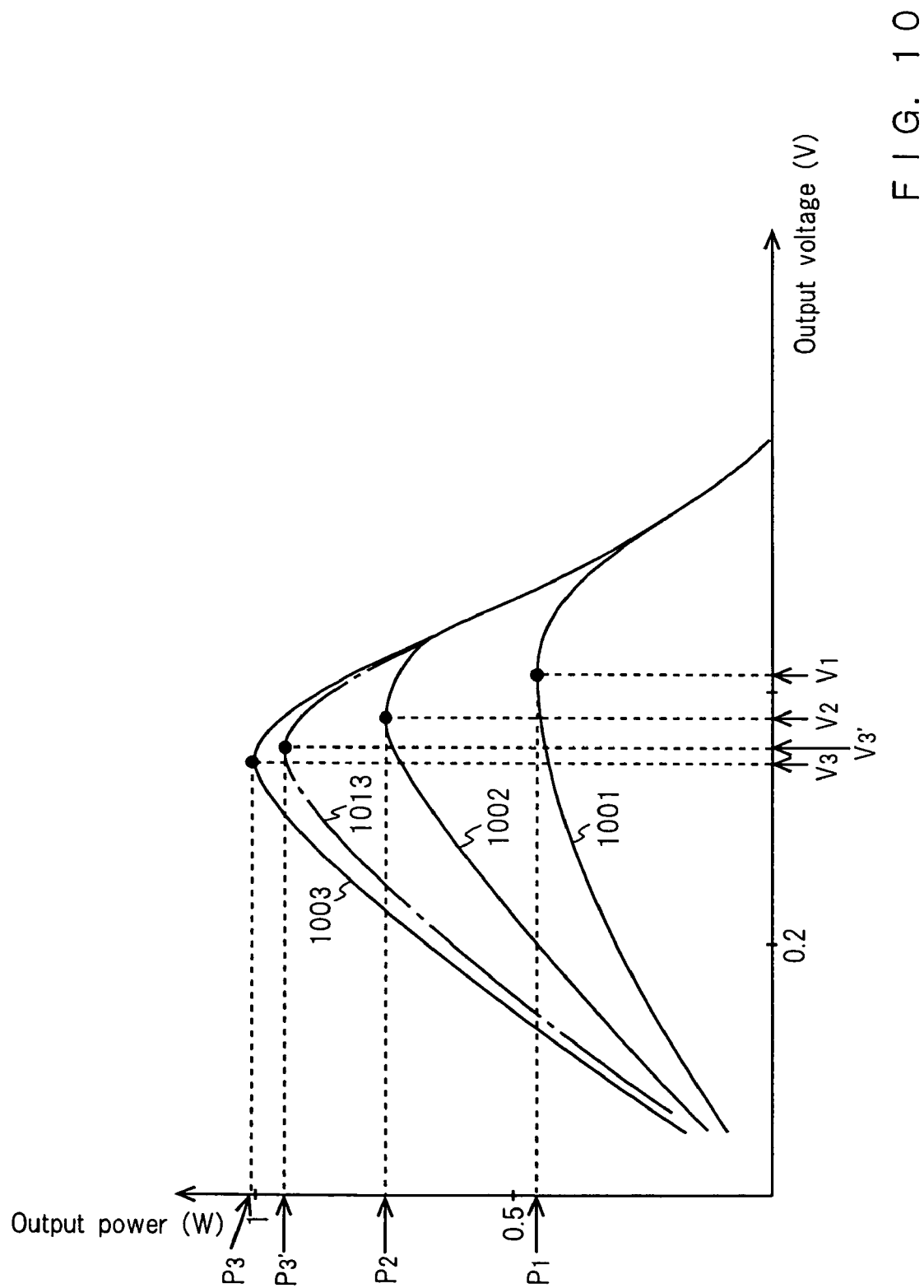
FIG. 10 shows the characteristics of output voltage-output power according to quantity of fuel of a balance type fuel cell used in the power supply apparatus in accordance with the second embodiment of the present invention.
Figure 11:
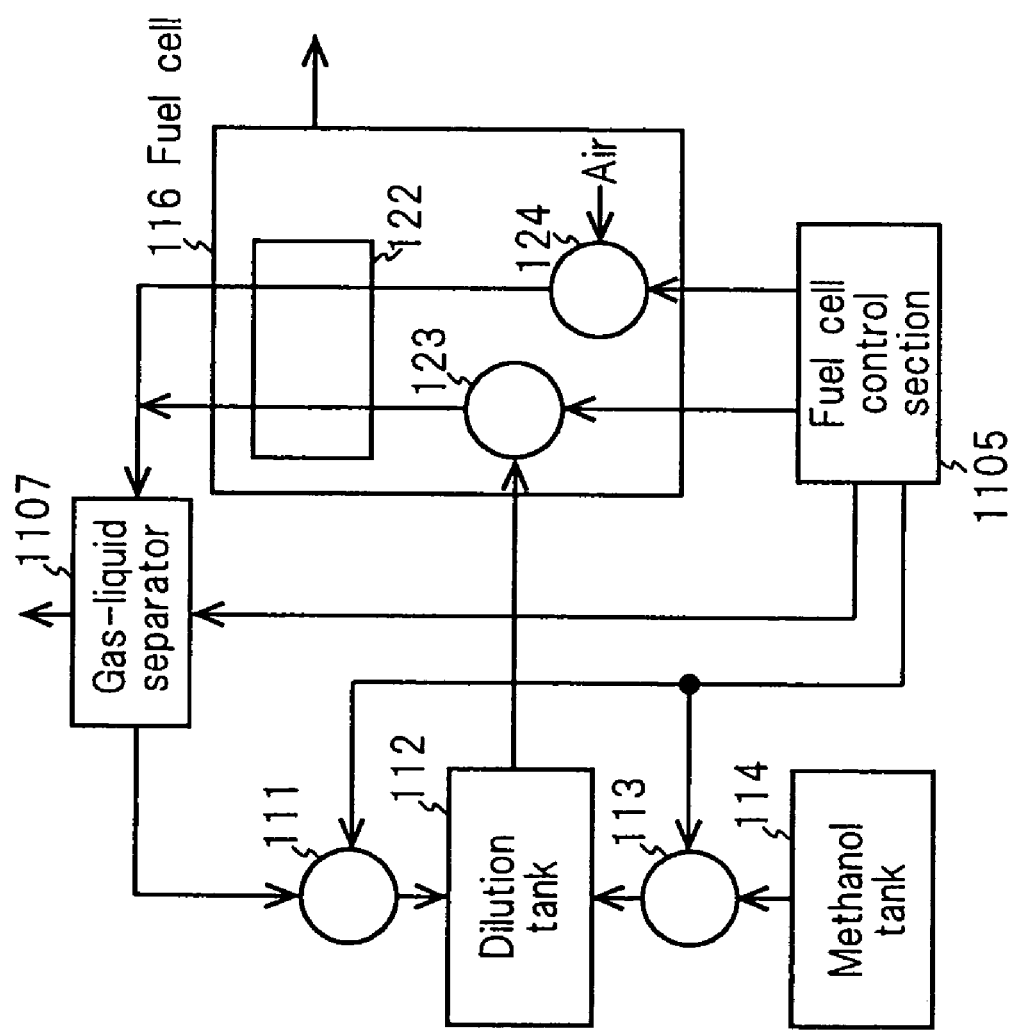
FIG. 11 is a block diagram showing the configuration of a circulation type fuel cell of the conventional art.
Figure 12:
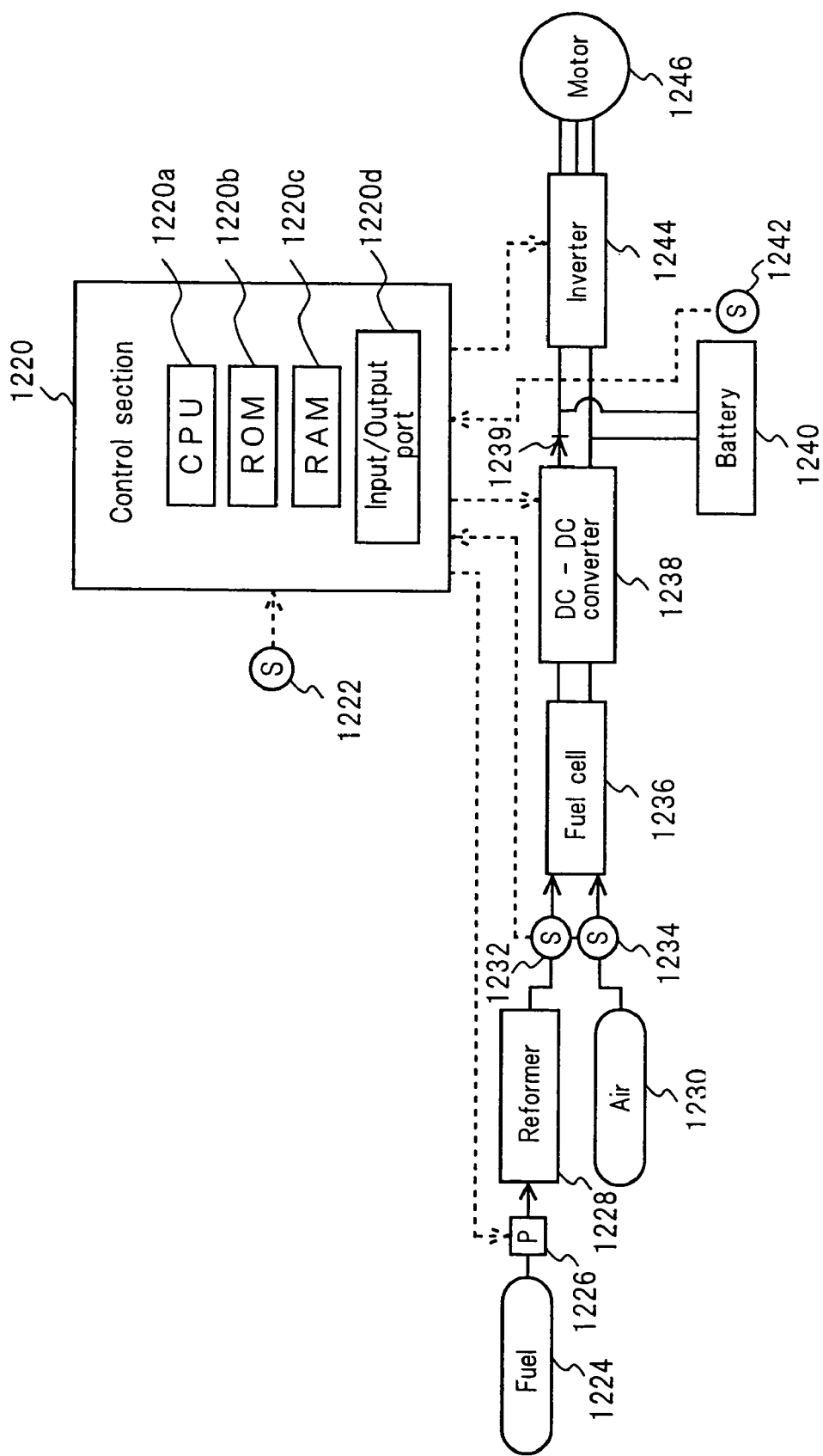
FIG. 12 is a block diagram showing the configuration of a fuel cell system of the conventional art.

With reference to FIG. 9 and FIG. 10, the power supply apparatus in accordance with the second embodiment will be described below. The DC—DC converter 119 of the first embodiment controls the output power so that the output current of the fuel cell 116 (the input current of the DC—DC converter 119) coincides with the target current. The DC—DC converter 919 of the second embodiment controls the output power so that the output voltage of the fuel cell 116 (the input voltage of the DC—DC converter 119) coincides with the target voltage.

First, the configuration of a power supply apparatus of the second embodiment will be described below. FIG. 9 is a block diagram showing the configuration of the power supply apparatus in accordance with the second embodiment of the present invention. The power supply apparatus 901 of the second embodiment has a DC—DC converter 919 as substitute for the DC—DC converter 119 of the first embodiment. In all other points, the power supply equipment 901 of the second embodiment is the same as that of the first embodiment. In FIG. 9, the same reference numeral is appended to the same block with the first embodiment. Descriptions of the same block will be omitted.

The fuel cell 116 is a balance type fuel cell using methanol as fuel (a non-circulation type direct methanol fuel cell, which balances the quantity of fuel to be used with the electric energy to be outputted). The secondary battery 120 is a lithium ion secondary battery. The capacity of the secondary battery 120 is 16 Wh. The main device 102 is a personal computer.

The power outputted from the fuel cell 116 is controlled at the DC—DC converter 919 so that it comes to the target voltage. In a case where there is a surplus of power outputted from the fuel cell 116 (the DC—DC converter 919) even when the power is supplied to the main device 102, the power supply apparatus 901 supplies power outputted from the fuel cell 116 to the main device 102, and charges the secondary battery 120 with the surplus power. In a case where the power outputted from the fuel cell is lacking power to supply enough the main device 102, the secondary battery 120 discharges the lacking power. The power supply apparatus 901 supplies the power combined the power outputted from the fuel cell 116 and the power discharged by the secondary battery 120 to the main device 102.

The power supply apparatus 901 has three power generating modes (in other words, the power supply apparatus 901 has three target electric energy values). The power supply apparatus supplies to the fuel cell 116 a certain quantity of fuel per unit hour which varies according to each power-generating mode. The fuel cell control section 117 seeks the residual capacity of the secondary battery 120 from the output voltage of the secondary battery 120 detected by the secondary battery output voltage detector 121. The fuel cell control section 117 selects the power-generating mode based on the residual capacity of the secondary battery 120. The fuel cell control section 117 controls the output power of the fuel cell 116. That is, the fuel cell control section 117 designates the quantity of fuel to be supplied to the fuel cell 116 in accordance with the selected power-generating mode, and indicates to the DC—DC converter 919 of the value of the input target voltage. As will be described below, in a case where a certain quantity of fuel is supplied to the fuel cell, relations between the output power and the output voltage will be represented as a certain function on a graph. The DC—DC converter 919 controls the output current so that the output voltage of the fuel cell 116 detected by the fuel cell output voltage detector 126 (the input voltage of the DC—DC converter 919) coincides with the input target voltage as much as possible. That is, the fuel cell 116 outputs the predetermined output power (=the output voltage of the fuel cell 116×the output current corresponding to that output voltage), and the DC—DC converter 919 converts the output power of the fuel cell 116 and supplies to the load 131 and/or the secondary battery 120.

Since reaction within the fuel cell 116 is similar to the first embodiment, its description will be omitted.

FIG. 10 shows the characteristics of output voltage-output power according to the quantity of fuel of a balance type fuel cell used in the power supply apparatus in accordance with the second embodiment of the present invention. FIG. 10 is a diagram drawn by altering FIG. 2, in which the horizontal axis in FIG. 2 is current scale, whereas the horizontal axis in FIG. 10 is voltage scale. In FIG. 10, the horizontal axis is output voltage scale (V), and the vertical axis is output power scale (W). Lines 1001, 1002 and 1003 shows the characteristics of output voltage-output power at the initial period in a case where the quantity of fuel is supplied at 0.1 cc/min, 0.2 cc/min and 0.3 cc/min, respectively. Line 1013 shows the characteristic of output voltage-output power after a secular change in a case where quantity of fuel is supplied at 0.3 cc/min. The characteristics of output voltage-output power of the fuel cell 116 vary according to the quantity of fuel to be supplied to the fuel cell 116. When the quantity of fuel is fixed at a certain value, the characteristic of output voltage-output power at that quantity of fuel is uniquely fixed.

In FIG. 10, in a case where the quantity of fuel is supplied at 0.1 cc/min, the output voltage value at the point with the maximum output power of the fuel cell 116 in the initial period is $V_1$, and the output electric energy (the target electric energy) at the point with the maximum output power of the fuel cell 116 in the initial period is $P_1$. In the case where quantity of fuel is supplied at 0.2 cc/min, the output voltage value at the point with the maximum output power of the fuel cell 116 in the initial period is $V_2$, and the output electric energy (the target electric energy) at the point with the maximum output power of the fuel cell 116 in the initial period is $P_2$. In the case where the quantity of fuel is supplied at 0.3 cc/min, the output voltage value at the point with the maximum output power of the fuel cell 116 in the initial period is $V_3$, and the output electric energy (the target electric energy) at the point with the maximum output power of the fuel cell 116 in the initial period is $P_3$. In the case where the quantity of fuel is supplied at 0.3 cc/min, the output voltage value at the point with the maximum output power of the fuel cell 116 after a secular change is $V_3'$, and the output electric energy (the target electric energy) at the point with the maximum output power of the fuel cell 116 after a secular change is $P_3'$. The power supply apparatus 901 in accordance with the second embodiment conducts constant-voltage control over the output of the fuel cell 116.

The balance type fuel cell in accordance with the second embodiment of the present invention supplies a certain quantity of fuel per unit time to the fuel cell 116 in each power generating mode, and generates power within the range of predetermined value from the voltage value with the maximum output power at that quantity of fuel. Therefore, nearly all the supplied methanol is used up, and only a minute quantity of methanol is discharged. Hence, the configuration of the purification section 115 can be simplified. Such range is determined depending on the quantity of fuel.

The memory section 125, based on a diagram of the characteristics of output current-output voltage and the characteristics of output current-output power with the quantity of fuel as parameter (e.g. FIG. 2 and FIG. 10), correlate and store a certain quantity of fuel supplied per unit time to the fuel cell 116 in each power generating mode, an output voltage value with the maximum output power at that quantity of fuel (hereinafter will refer to as "the target value which gives the maximum power"), and a target value of the voltage value which is to be actually outputted to the fuel cell 116 (hereinafter will refer to as "the operation target value". The value ranging from the target value (the voltage value) for giving the maximum power, to the voltage value which is smaller by the predetermined value (the voltage value before the output voltage drops drastically) than that the target value which gives the maximum power), and the target output power of the fuel cell 116. The memory section may store the relational expression between the operation target value and the target value which gives the maximum power, and store either one of the operation target value or the target value which gives the maximum power.

The fuel cell control section 117 indicates to the DC—DC converter 919 of the target output voltage value corresponding to the quantity of fuel. For example, in a case where methanol is supplied with the quantity of fuel supplied at 0.3 cc/min, the fuel cell control section 117 indicates to the DC—DC converter 919 based on the correlation table of the memory 125, so that the output voltage value of the fuel cell 116 comes to a value within the range of $V_3$ (the output voltage of a point with the maximum output power) to $V_3 - \gamma_0$ ($\gamma_0$ is a positive value) (e.g. $V_3 - \gamma_0 (0 < \gamma_1 < \gamma_0)$). In the same method as in the first embodiment, the fuel cell control section 117 updates the operation target value itself, the target value which gives the maximum power and the quantity of fuel supply at each predetermined intervals ($T_1$, $T_2$). Since the operating method of a power supply apparatus of the second embodiment is the same with the operating method of the power supply apparatus of the first embodiment in all other points, the description will be omitted.

In FIG. 10, the inclination of the characteristics of output current-output power in an area where voltage is smaller than the point with the maximum output power is by far gentle than the inclination of the characteristic of output current-output power in an area where current is larger than the point with the maximum output power in FIG. 2. This shows that the constant-voltage control in accordance with the second embodiment is far easier than the constant-current control in accordance with the first embodiment. The second embodiment is capable of supplying power more stably than the first embodiment.

In the first and the second embodiment, a lithium ion secondary battery is used as the secondary battery, alternatively other types of secondary batteries such as lead-acid battery, nickel-cadmium battery or nickel metal hydride storage battery may be used.

In the first and the second embodiment, the main device was a personal computer. Alternatively the main device may be other apparatus needing a power supply.

In the first and the second embodiment, the power supply apparatus has three power generating modes. However, the present invention is not to be limited by this number, and the power supply apparatus may have N power generating modes (N is a positive integer of 2 or larger).

In the first and the second embodiment, although intervals for correcting are set at 10 minutes for $T_1$, and 100 minutes for $T_2$, these values may be changed to other values.

The operation target value may be the same value as the target value which gives the maximum power ($\alpha_1 = 0$). The operation target value may be a value which subtracts the predetermined current value from the target value which gives the maximum power, or it may be a value which adds the predetermined voltage value to the target value which gives the maximum power.

The power supply apparatus may calculate the output power of the fuel cell by measuring the output voltage and the output current of a DC—DC converter, and dividing that product with the power conversion efficiency ratio of the DC—DC converter. In a case where power conversion efficiency of the DC—DC converter can be considered as approximately constant, the output power of the DC—DC converter may be treated as approximately the output power of the fuel cell.

The present invention realizes a power supply apparatus which operates stably by using the fuel cell and the secondary battery concurrently.

The power supply apparatus of the present invention is useful as a power supply apparatus for various devices such as personal computers.

Although the present invention has been described in terms of the presently preferred embodiments, it should be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A power supply apparatus comprising:
a fuel cell;
a secondary battery for supplying power to a load;
a power measurement section for measuring an output power of said fuel cell;
a power converter which inputs said output power of said fuel cell, controls an output power so that an input voltage or an input current approaches an operation target value, supplies said output power to said load and/or said secondary battery and conducts a power conversion; and
a control section which:
controls quantity of fuel to be supplied to said fuel cell,
indicates a selected value to said power converter as said operation target value, said selected value being a value within a predetermined range of values that corresponds to the smallest quantity of fuel that said fuel cell discharges,
indicates a plurality of power measurement target values to said power converter, and
updates said operation target value of said power converter based on a plurality of output power measurements of said fuel cell, each of said plurality of output power measurements being measured by said power measurement section for each of said plurality of said power measurement target values.

2. A power supply apparatus comprising:
a fuel cell;
a secondary battery for supplying power to a load;
a power measurement section for measuring an output power of said fuel cell;
a power converter which inputs said output of said fuel cell, controls said output power so that an input voltage or an input current approaches the operation target value, supplies said output power to said load and/or said secondary battery and conducts a power conversion; and
a control section which:
controls quantity of fuel to be supplied to said fuel cell,
indicates a selected value to said power converter as operation target value, said selected value being a value within a predetermined range of values that corresponds to the smallest quantity of fuel said fuel cell discharges,
sequentially indicates a plurality of power measurement target values to said power converter,
seeks a target value which gives the maximum power as a criterion among a plurality of output power measurements of said fuel cell, each being measured by said power measurement section for each of said plurality of power measurement target values, and
updates said operation target value to be said target value which gives the maximum power itself or values which are gained from subtracting or adding the predetermined current or voltage from said target value which gives the maximum power.

3. A power supply apparatus, as claimed in claim 2, wherein said control section has a plurality of power generating modes, and supplies to said fuel cell a certain quantity of fuel per unit time which varies for each said power generating modes;
said power supply apparatus further comprising a memory section for storing said operation target value and/or said target value which allies maximum power for each said power generating modes; wherein
at a startup of the power supply apparatus, or when said power generating mode is changed, or at least once in a predetermined time, said control section indicates a plurality of power measurement target values to said power converter, said power measurement section measures output power of said fuel cell at each said power measurement target value said control section seeks said target value which gives the maximum power among said plurality of output powers, and updates said operation target value based on said target value which gives the maximum power, and said memory section stores said operation target value and/or said target value which gives said maximum power for each said power generating mode.

4. A power supply apparatus, as claimed in claim 2, characterized in that a plurality of power measurement target values are determined, centering on the present operation target value.

5. A power supply apparatus, as claimed in claim 2, characterized in that in a case where said output power of said fuel cell in regard to a second power measurement target value is larger than the output power of said fuel cell in regard to a first power measurement target value, wherein said second power measurement target value is larger than said first power measurement target value the output power of said fuel cell in regard to a third power measurement target value which is still larger than said second power measurement target value is measured, and
in a case where said output power of said fuel cell in regard to said second power measurement target value is smaller than said output power of said fuel cell in regard to said first power measurement target value, said output power of said fuel cell in regard to said third power measurement target value which is still smaller than said first power measurement target value is measured.

6. A power supply apparatus, as claimed in claim 5, comprising a memory section for storing change in said target value which gives the maximum power; wherein
in a case where said target value which gives the maximum power has increased as to that change, said output power of said fuel cell is measured at the power measurement target value which is larger than the present said target value which gives the maximum power, and in a case where said target value which gives the maximum power has decreased as to that change, said output power of said fuel cell is measured at said power measurement target value which is smaller than the present said target value which gives the maximum power.

7. A power supply apparatus, as claimed in claim 1, comprising a memory section for storing a target output power of said fuel cell for each said power generating mode; wherein said control section has a plurality of power generating modes, and supplies to said fuel cell a certain quantity of fuel per unit time which varies for each said power generating modes; and wherein in a case where the finite difference between said output power of said fuel cell in regard to said target value which gives the maximum power or said operation target value corresponding to said target value which gives the maximum power, and said target output power, is not within the predetermined range, said control section changes the quantity of fuel to be supplied to said fuel cell so as to minimize that finite difference.

8. A power supply apparatus, as claimed in claim 1, characterized in that said fuel cell is a direct methanol fuel cell.

9. A power supply apparatus, as claimed in claim 1, characterized in that said fuel cell is a balance type which balances fuel and said output power of said fuel cell.

10. A power supply apparatus, as claimed in claim 2, comprising a memory section for storing a target output power of said fuel cell for each said power generating mode; wherein said control section has a plurality of power generating modes, and supplies to said fuel cell a certain quantity of fuel per unit time which varies for each said power generating modes; and wherein in a case where the finite difference between said output power of said fuel cell in regard to said target value which gives the maximum power or said operation target value corresponding to said target value which gives the maximum power, and said target output power, is not within the predetermined range, said control section changes the quantity of fuel to be supplied to said fuel cell so as to minimize that finite difference.

11. A power supply apparatus, as claimed in claim 2, characterized in that said fuel cell is a direct methanol fuel cell.

12. A power supply apparatus, as claimed in claim 2, characterized in that said fuel cell is a balance type which balances fuel and said output power of said fuel cell.

* * * * *